US012710710B2

(12) United States Patent
Takada

(10) Patent No.: US 12,710,710 B2
(45) Date of Patent: Aug. 18, 2026

(54) DEVELOPING DEVICE

(71) Applicant: CANON KABUSHIKI KAISHA, Tokyo (JP)

(72) Inventor: Shunichi Takada, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/884,367

(22) Filed: Sep. 13, 2024

(65) Prior Publication Data

US 2025/0110425 A1 Apr. 3, 2025

(30) Foreign Application Priority Data

Oct. 2, 2023 (JP) ................................ 2023-171510

(51) Int. Cl.
*G03G 15/09* (2006.01)
*G03G 15/095* (2006.01)

(52) U.S. Cl.
CPC ....... *G03G 15/0928* (2013.01); *G03G 15/095* (2013.01); *G03G 2215/0609* (2013.01)

(58) Field of Classification Search
CPC ........... G03G 15/0921; G03G 15/0812; G03G 15/0928; G03G 15/0808; G03G 15/09; G03G 2215/0609
See application file for complete search history.

(56) References Cited

U.S. PATENT DOCUMENTS

| | | | | |
|---|---|---|---|---|
| 5,987,280 A | 11/1999 | Sato et al. | | |
| 2014/0016969 A1* | 1/2014 | Yoshii | G03G 15/0865 399/269 | |
| 2017/0269508 A1* | 9/2017 | Shimizu | G03G 15/0907 | |
| 2017/0269510 A1* | 9/2017 | Tamaki | G03G 15/0889 | |

FOREIGN PATENT DOCUMENTS

| | | |
|---|---|---|
| JP | H09-325614 A | 12/1997 |
| JP | 2002-148943 A | 5/2002 |
| JP | 2003-149942 A | 5/2003 |
| WO | 09525989 A1 | 9/1995 |

* cited by examiner

*Primary Examiner* — Jessica L Eley
(74) *Attorney, Agent, or Firm* — VENABLE LLP

(57) ABSTRACT

A developing device includes a first rotatable member and a first magnet provided non rotatably and stationarily inside the first rotatable member. A second rotatable member is provided opposed to the first rotatable member, and a second magnet is provided non rotatably and stationarily inside the second rotatable member. The rotational direction of the second rotatable member is the same as the rotational direction of the first rotatable member, and with respect to the rotational direction of the second rotatable member, a maximum position where a magnetic flux density of a fourth magnetic pole in a normal direction relative to the outer peripheral surface of the second rotatable member is maximum is positioned downstream of the position where on the outer peripheral surface of the second rotatable member, the second rotatable member is closest to the first rotatable member, and is positioned upstream of a fifth magnetic pole.

11 Claims, 16 Drawing Sheets

DEVELOPING DEVICE

FIELD OF THE INVENTION AND RELATED ART

The present invention relates to a developing device for developing an electrostatic latent image, formed on an image bearing member, with a developer.

As the developing device, a constitution in which a peeling roller for peeling and collecting the developer from a developing roller for developing the electrostatic latent image, formed on the image bearing member, with the developer is provided is known (Japanese Laid-Open Patent Application (JP-A) No. 2003-149942). The developing roller includes a rotatable developing sleeve and a non-rotatable developing magnet provided inside the developing sleeve, and causes the developing sleeve to carry the developer on a surface thereof by a magnetic force of the developing magnet. Similarly, the peeling roller includes a rotatable peeling sleeve and a non-rotatable peeling magnet provided inside the peeling sleeve, and causes the peeling sleeve to carry the developer on a surface thereof by a magnetic force of the peeling magnet. Further, the developer (used developer) after being carried and fed by the developing sleeve and then being used for developing the electrostatic latent image on the image bearing member is carried on the surface of the peeling sleeve, so that the developer is collected from the developing roller by the peeling roller.

In the case of the constitution disclosed in JP-A 2003-149942, in an opposing portion where the peeling sleeve opposes the developing sleeve, the peeling sleeve is rotated so that a surface thereof is moved in the same direction as the surface of the developing sleeve, i.e., in a forward direction.

Further, the developing magnet includes a delivery pole which is a magnetic pole for delivering the developer from the developing roller to the peeling roller, and the peeling magnet includes a receiving pole which is a magnetic pole for receiving the developer from the developing roller by the peeling roller. In the constitution disclosed in JP-A 2003-149942, a peak position which is a position where a normal component of a magnetic flux density of the receiving pole on the peeling sleeve shows a maximum value is positioned on a side upstream, with respect to a rotational direction of the peeling sleeve, of a rectilinear line connecting a rotation center of the developing sleeve and a rotation center of the peeling sleeve.

However, as in the constitution disclosed in JP-A 2003-149942, in the case where the peak position of the receiving pole is positioned on the side upstream, with respect to the rotational direction of the peeling sleeve, of the rectilinear line connecting the rotation center of the developing sleeve and the rotation center of the peeling sleeve, the following problem arises. That is, the developer delivered to the peeling roller forms a magnetic chain (bristle) along a line of magnetic force of the receiving pole, and an end of the magnetic chain contacts the developing roller. At this time, the peak position of the receiving pole is positioned on the side upstream, with respect to the rotational direction of the peeling sleeve, of the rectilinear line connecting the rotation center of the developing sleeve and the rotation center of the peeling sleeve, and therefore, the magnetic chain carrying the developing roller travels while being compressed between the developing roller and the peeling roller. Further, the magnetic chain is broken at this time, so that the magnetic chain moves toward the opposing portion between the developing roller and the peeling roller in a state in which a part thereof is left on the developing roller.

In this opposing portion, the magnetic chain of the developer on the peeling roller lies between adjacent magnetic poles, and the line of magnetic force is formed in a direction extending along the surface of the peeling roller, and therefore, a magnetic force for collecting the developer, left on the developing roller, onto the peeling roller does not readily act on the magnetic chain. The developer left on the developing roller is moved along the surface of the developing sleeve or is dropped downward, and thus is supplied again to the developing roller before being taken into a developer circulating path of the developing device. As a result, the supplied developer has the influence on a distribution of a TD ratio (T/D, i.e., a ratio of a toner weight to a total weight of a carrier and the toner) of the developer carried on the developing sleeve, so that an image defect such that a color tint of a toner image after the development of the electrostatic latent image fluctuates or the like occurs.

SUMMARY OF THE INVENTION

A principal object of the present invention is to improve a delivery property of a developer from a first rotatable member to a second rotatable member.

According to an aspect of the present invention, there is provided a developing device comprising: a first chamber configured to accommodate a developer including toner and a carrier; a second chamber partitioned from the first chamber by a partition wall; a first rotatable member to which the developer accommodated in the first chamber is supplied and which carries and feeds the developer to a developing position where an electrostatic latent image formed on an image bearing member is developed; a first magnet provided non-rotatably and stationarily inside the first rotatable member, wherein the first magnet includes a first magnetic pole provided opposed to the image bearing member in the developing position, a second magnetic pole provided downstream of the first magnetic pole with respect to a rotational direction of the first rotatable member, and a third magnetic pole provided downstream of the second magnetic pole and adjacent to the second magnetic pole, with respect to the rotational direction of the first rotatable member, and having the same magnetic polarity as that of the second magnetic pole; a second rotatable member provided opposed to the first rotatable member and to which the developer is delivered from the first rotatable member by a magnetic field generated by the first magnet, wherein the second rotatable member carries and feeds the developer for collecting the developer, after the electrostatic latent image is developed, into the second chamber; and a second magnet provided non-rotatably and stationarily inside the first rotatable member, wherein the second magnet includes a plurality of magnetic poles including a fourth magnetic pole having a magnetic polarity different from that of the second magnetic pole, a fifth magnetic pole provided downstream of the fourth magnetic pole with respect to a rotational direction of the second rotatable member, and a sixth magnetic pole provided downstream of the fifth magnetic pole and adjacent to the fifth magnetic pole, with respect to the rotational direction of the second rotatable member, and having the same magnetic polarity as that of the fifth magnetic pole, the fourth magnetic pole being a magnetic pole, of the plurality of magnetic poles, provided closest to the second magnetic pole, wherein the rotational direction of the second rotatable member in a position where on an outer peripheral surface of the second rotatable member, the second rotatable member is closest to the first rotatable member is the same as the rotational direction of the first rotatable member in a position where on an outer peripheral surface of the first rotatable member, the first rotatable member is closest to the second rotatable member, and wherein with respect to the rotational direction of the second rotatable member, a maximum position where a magnetic flux density of the fourth magnetic pole in a normal direction relative to the outer peripheral surface of the second rotatable member is maximum is positioned downstream of the position where on the outer peripheral surface of the second rotatable member, the second rotatable member is closest to the first rotatable member, and is positioned upstream of the fifth magnetic pole.

Further features of the present invention will become apparent from the following description of exemplary embodiments with reference to the attached drawings.

DESCRIPTION OF THE EMBODIMENTS

First Embodiment

A first embodiment will be described using FIGS. 1 to 15. First, a general structure of an image forming apparatus in this embodiment will be described with reference to FIG. 1.

[Image Forming Apparatus]

Figure 1:
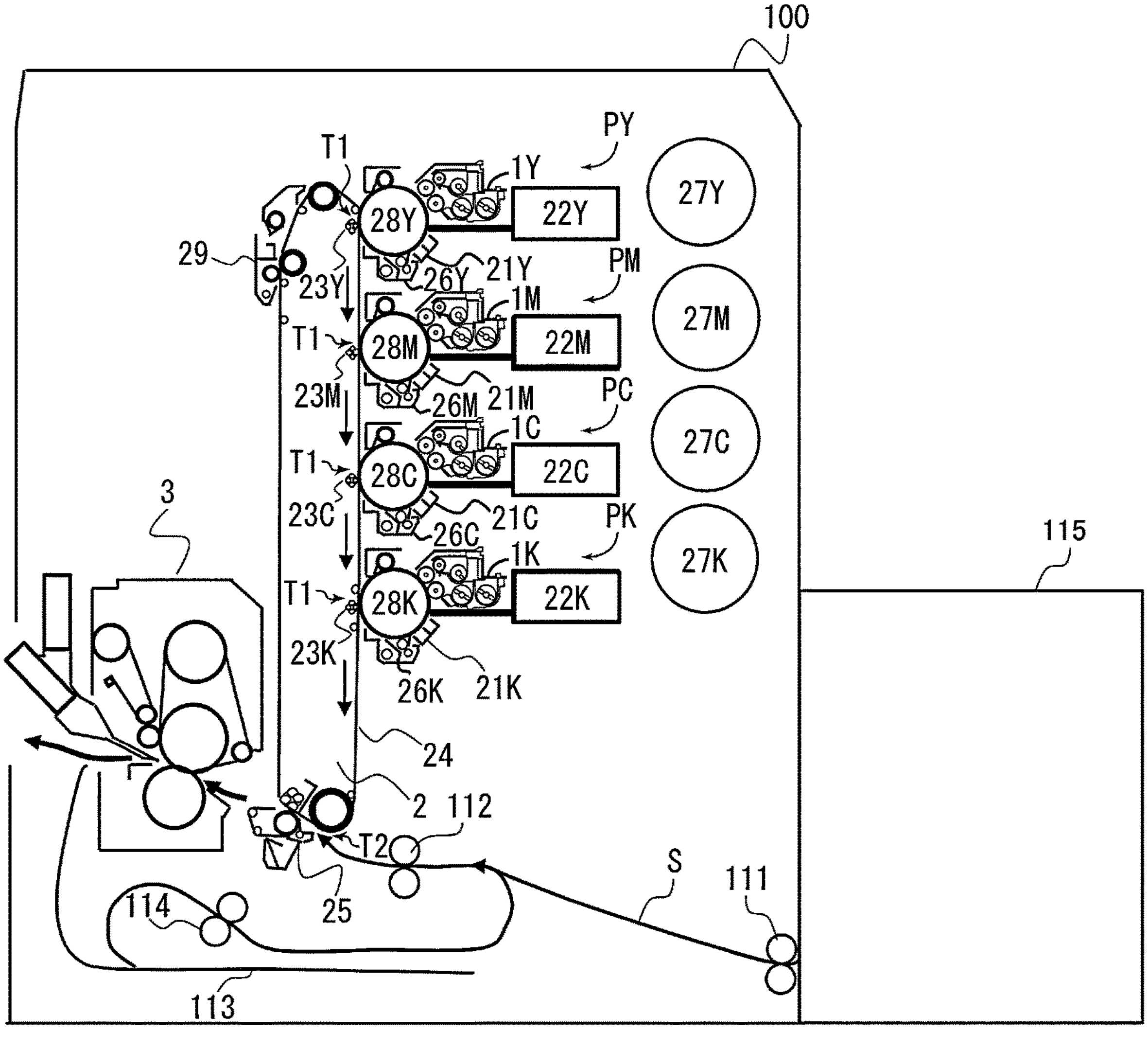
FIG. 1 is a schematic sectional view of an image forming apparatus according to a first embodiment.

An image forming apparatus 100 is a full-color image forming apparatus, and in the case of this embodiment, the image forming apparatus 100 is, for example, an MFP (multi-function peripheral) having a copy function, a printer function, and a scan function. The image forming apparatus 100 includes, as shown in FIG. 1, image forming portions PY, PM, PC, and PK for performing an image forming step of forming toner images of four colors of yellow, magenta, cyan, and black, respectively, which are juxtaposed. For the image forming apparatus 100, an original reading device is connected to an image forming apparatus main assembly (apparatus main assembly) or a host device such as a host computer is communicatably connected to the apparatus main assembly. Accordingly, in accordance with image information from the host device, a four-color-based full-color image of yellow (Y), magenta (M), cyan (C), and black (K) can be formed on a recording material (recording sheet, plastic sheet, cloth, and the like) by utilizing an electrophotographic type.

The image forming portions PY, PM, PC, and PK for the respective colors include primary chargers 21Y, 21M, 21C, and 21K, developing devices 1Y, 1M, 1C, and 1K, exposure devices 22Y, 22M, 22C, and 22K, photosensitive drums 28Y, 28M, 28C, and 28K, and cleaning devices 26Y, 26M, 26C, and 26K, respectively. Further, the image forming apparatus 100 includes a transfer device 2 and a fixing device 3. Incidentally, structures of the image forming portions PY, PM, PC, and PK are similar to each other, and therefore, in the following, description will be made using the image forming portion PY as a representative.

The photosensitive drum 28Y as an image bearing member is a photosensitive member having a photosensitive layer formed of a resin such as polycarbonate, containing an organic photoconductor (OPC), and is constituted so as to be rotated at a predetermined speed. The primary charger 21Y includes a corona discharge pole disposed at a periphery of the photosensitive drum 28Y and electrically charges a surface of the photosensitive drum 28Y by generated ions.

In the exposure device 22Y, a scanning optical device is assembled, and by exposing the charged photosensitive drum 28Y to light on the basis of image data, a potential of an exposed portion is lowered, so that a charge pattern (electrostatic latent image) corresponding to the image data is formed. The developing device 1Y develops the electrostatic latent image, formed on the photosensitive drum 28Y, by transferring a developer accommodated therein onto the photosensitive drum 28Y. The developer is prepared by mixing a carrier with toner of an associated color, and the electrostatic latent image is visualized (developed) with the toner.

The transfer device 2 includes primary transfer rollers 23Y, 23M, 23C, and 23K, an intermediary transfer belt 24, and a secondary transfer roller 25. The intermediary transfer belt 24 is wound around the primary transfer rollers 23Y, 23M, 23C, and 23K and a plurality of rollers, and is supported so as to be travelable.

The primary transfer rollers 23Y, 23M, 23C, and 23K as primary transfer members are disposed in a named order from above in FIG. 1 and correspond to the colors of Y (yellow), M (magenta), C (cyan), and K (black), respectively. The secondary transfer roller 25 is disposed outside the intermediary transfer belt 24 and is constituted so that the recording material is capable of passing through between the secondary transfer roller 25 and the intermediary transfer belt 24.

The respective color toner images formed on the photosensitive drums 28Y, 28M, 28C, and 28K are transferred (primarily transferred) onto the intermediary transfer belt 24 by the action of a primary transfer bias applied to the primary transfer rollers 23Y, 23M, 23C, and 23K in primary transfer portions (primary transfer nips) T1 where the intermediary transfer belt 24 contacts the photosensitive drums 28Y, 28M, 28C, and 28K. For example, during image formation of the four-color-based full-color image, in the order starting from the photosensitive drum 28Y, the toner images are transferred onto the intermediary transfer belt 24, so that a color toner image in which layers of yellow, magenta, cyan, and black are superposed is formed.

On the other hand, a recording material S accommodated in a cassette 115 as a recording material accommodated portion is fed toward the transfer device 2 through a pick-up roller 111 and a registration roller pair 112. The recording material S is fed to a secondary transfer portion (nip) T2 where the intermediary transfer belt 24 and a secondary transfer roller 25 as a secondary transfer member are in contact with each other, while being synchronized with the toner image onto the intermediary transfer belt 24. Then, the toner image formed on the intermediary transfer belt 24 is secondarily transferred onto the recording material S by the action of a secondary transfer bias applied to the secondary transfer roller 25 in the secondary transfer portion T2. To the recording material S on which the toner image is transferred, pressure and heat are applied in the field device 3. By this, the toner on the recording material S is melted, so that a color image is fixed on the recording material S. Thereafter, the recording material S is discharged to an outside of the image forming apparatus.

Incidentally, in the case where the image formation is carried out on both (double) sides (surfaces) of the recording material S, the recording material S passed through the field device 3 is fed to a reverse feeding path 113, in which the recording material S is turned upside down and is fed to the registration roller pair 112 by a feeding roller pair 114, and in the secondary transfer portion T2, similarly as described above, the toner image is transferred onto a back surface (side) of the recording material S. Then, in the field device 3, the toner image is fixed on the back surface of the recording material S.

A deposited matter such as the toner remaining on the photosensitive drums 28Y, 28M, 28C, and 28K after the primary transfer step is collected by the cleaning devices 26Y, 26M, 26C, and 26K. By this, the photosensitive drums 28Y, 28M, 28C, and 28K prepare for a subsequent image forming step. Further, a deposited matter remaining on the intermediary transfer belt 24 after the secondary transfer step is removed by an intermediary transfer belt cleaner 29.

Incidentally, the image forming apparatus 100 in this embodiment is capable of forming a desired monochromatic (single color) image, such as a black image, or a multi-color image by using the image forming portion for a desired single color or some of the image forming portions for the four colors. Further, in FIG. 1, the constitution in which the image forming portions PY, PM, PC, and PK for the respective colors are disposed in a vertical direction is employed, but may also be disposed in a horizontal direction or an oblique direction.

Further, in this embodiment, an outer diameter of each of the photosensitive drums 28Y, 28M, 28C, and 28K is for example 80 [mm], and the image forming operation is executed while rotating the photosensitive drums at a peripheral speed of 513 mm/sec.

Developer storage portions 27Y, 27M, 27C, and 27K are provided correspondingly to the developing devices 1Y, 1M, 1C, and 1K, respectively, and in which bottles accommodating developers corresponding to the colors of yellow, magenta, cyan, and black are exchangeably mounted in a named order from above, respectively. The developer storage portions 27Y, 27M, 27C, and 27K are constituted so that the developers are capable of being fed (supplied) therefrom to the developing devices 1Y, 1M, 1C, and 1K corresponding to the colors of the developers stored therein, respectively.

For example, a toner weight ratio of the developer accommodated in each bottle is 80 to 95%, and a toner weight ratio of the developer in each of the developing devices 1Y, 1M, 1C, and 1K is 5 to 10%. For that reason, when the toner is consumed by development in each of the developing devices 1Y, 1M, 1C, and 1K, the developer containing the toner in an amount corresponding to a consumption amount of the toner is supplied, so that the toner weight ratio of the developer in each of the developing devices 1Y, 1M, 1C, and 1K is maintained in a constant amount.

[Developing Device]

Next, the photosensitive drums 1Y, 1M, 1C, and 1K will be specifically described using FIGS. 2 to 5.

Figure 2:
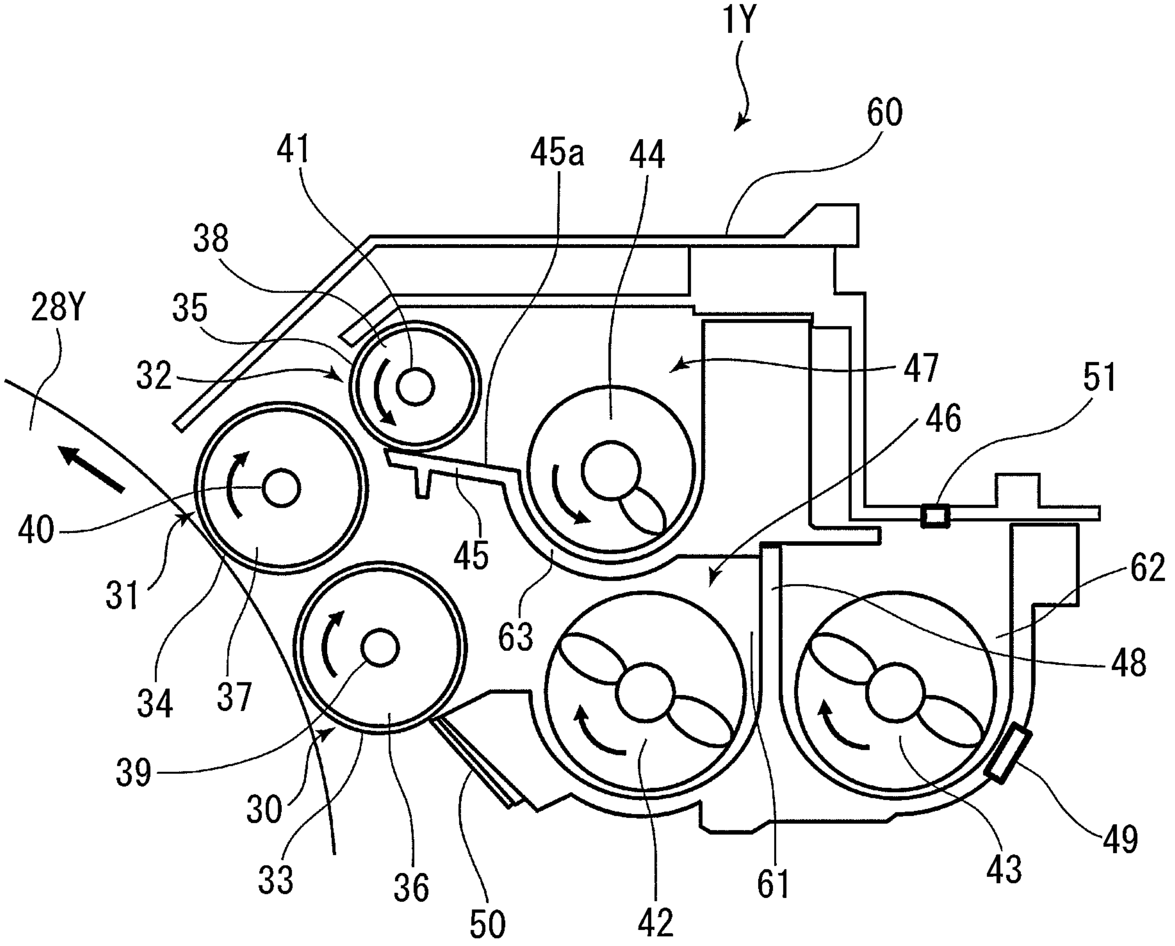
FIG. 2 is a schematic sectional view of a developing device according to the first embodiment.

Incidentally, structures of the developing devices 1Y, 1M, 1C, and 1K are the same, and therefore, in the following, the developing device 1Y will be described as a representative. FIG. 2 is a conceptual view illustrating the developing device 1Y shown in FIG. 1, and FIGS. 3 to 5 are conceptual views illustrating magnetic pole structures of a first developing magnet (first magnet) 36, a second developing magnet (second magnet) 37, and a peeling magnet (third magnet) 38 which are provided inside the developing device 1Y, respectively.

The developing device 1Y includes, as shown in FIG. 2, a first developing roller 30, a second developing roller 31, a peeling roller 32, a developer supplying screw 42, a developer stirring screw 43, and a developer collecting screw 44, and these members are accommodated in a developing container 60. The developing container 60 accommodates a two-component developer containing non-magnetic toner and a magnetic carrier.

The first developing roller 30 is a developer carrying member which is rotationally driven, and is provided in a position adjacent to the photosensitive drum 28Y so that a rotational axis thereof is substantially parallel to a rotational axis of the photosensitive drum 28Y. The first developing roller 30 includes a first developing sleeve 33 which is rotatable, and the first developing magnet (fixed magnet) 36 non-rotationally provided inside the first developing sleeve

33 and for attracting the developer to a surface of the first developing sleeve 33 by a magnetic force. Then, the first developing roller 30 attracts (carries) the developer, scooped from the developer supplying screw 42, on the basis of the magnetic force, and develops the electrostatic latent image formed on the rotating photosensitive drum 28Y (image bearing member), with the developer.

The first developing sleeve 33 is a non-magnetic cylindrical member and is rotationally driven about a rotation shaft 39. A rotational direction of the first developing sleeve 33 is the clockwise direction as indicated by an arrow in FIG. 2 and is a direction opposite to a rotational direction of the photosensitive drum 28Y. For this reason, the first developing sleeve 33 and the photosensitive drum 28Y rotate in the same direction (forward direction) at mutually opposing positions (opposing portion). That is, the first developing sleeve 33 is rotated so that a surface thereof opposing the photosensitive drum 28Y moves from below toward above in a vertical direction.

Figure 3:
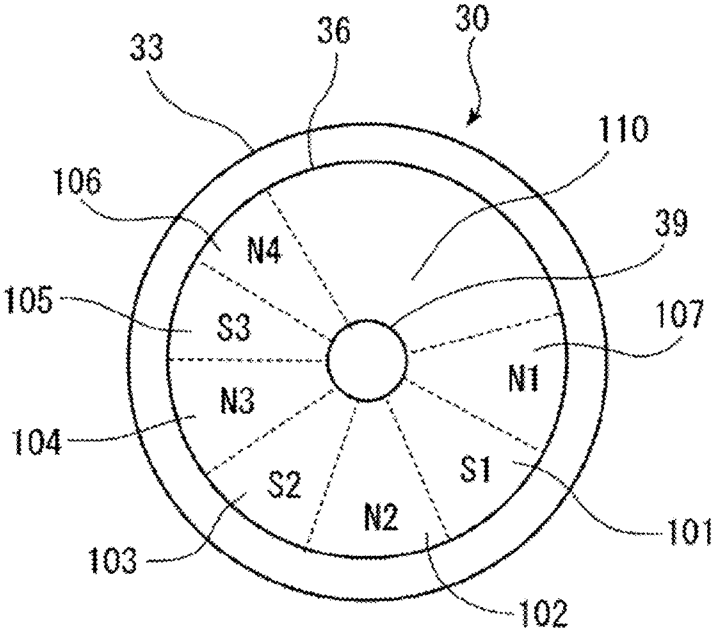
FIG. 3 is a schematic view showing a magnetic pole arrangement of a first developing roller in the first embodiment.

The first developing magnet 36 is disposed inside the first developing sleeve 33 and includes, as shown in FIG. 3, a plurality of magnetic poles 101 to 107. Between an inner periphery of the first developing sleeve 33 and an outer periphery of the first developing magnet 36, a space permitting rotation of the first developing sleeve 33 is provided.

The developer attracted onto the first developing sleeve 33 is fed toward the photosensitive drum 28Y by a rotation operation of the first developing sleeve 33, so that the electrostatic latent image formed on the photosensitive drum 28Y is developed with the developer. After the electrostatic latent image formed on the photosensitive drum 28Y is developed with the developer, the developer on the first developing sleeve 33 is fed to the neighborhood of the second developing roller 31 by a rotation operation of the first developing sleeve 33. Then, in the neighborhood of a closest position between the first developing roller 30 and the second developing roller 31, the developer is peeled off from the first developing sleeve 33 and then delivered to a surface of a second developing sleeve 34 by a magnetic field generated by the first developing magnet 36 included in the first developing roller 30 and by the second developing magnet 37 included in the second developing roller 31.

The second developing roller 31 as a developing roller is a developer carrying member which is rotationally driven, and is provided downstream of the first developing roller 30 with respect to the rotational direction of the photosensitive drum 28Y and above a rotation center of the first developing roller 30 with respect to the vertical direction. To the second developing roller 31, the developer is delivered from the first developing roller 30 by the magnetic force. The second developing roller 31 is, similarly as the first developing roller 30, provided in a position adjacent to the photosensitive drum 28Y so that a rotational axis thereof is substantially parallel to a rotational axis of the photosensitive drum 28Y. Accordingly, the second developing roller 31 and the first developing roller 30 are substantially parallel to each other in rotational axis.

Such a second developing roller 31 includes the second developing sleeve 34 which is rotatable, and the second developing magnet (fixed magnet) 37 non-rotationally provided inside the second developing sleeve 34 and for attracting the developer to a surface of the second developing sleeve 34 by a magnetic force. Then, on the basis of the magnetic force, to the second developing roller 31, the developer is delivered from the first developing roller 30 (the first developing sleeve 33), and the second developing roller 31 attracts (carries) the developer, and develops the electrostatic latent image formed on the rotating photosensitive drum 28Y, with the developer. Incidentally, on a side of the second developing roller 31, the peeling roller 32 described later is positioned.

The second developing sleeve 34 is a non-magnetic cylindrical member and is rotationally driven about a rotation shaft 40. A rotational direction of the second developing sleeve 34 is the clockwise direction as indicated by an arrow in FIG. 2 and is a direction opposite to the rotational direction of the photosensitive drum 28. For this reason, the second developing sleeve 34 and the photosensitive drum 28Y rotate in the same direction (forward direction) at mutually opposing positions (opposing portion). That is, the second developing sleeve 34 is rotated so that a surface thereof opposing the photosensitive drum 28Y moves from below toward above in the vertical direction. Further, the first developing sleeve 33 and the second developing sleeve 34 rotate in opposite directions at mutually opposing positions.

The second developing magnet 37 is disposed inside the second developing sleeve 34 and includes a plurality of sector magnetic poles 201 to 207. Between an inner periphery of the second developing sleeve 34 and an outer periphery of the second developing magnet 37, a space permitting rotation of the second developing sleeve 34 is provided.

The developer attracted onto the second developing sleeve 34 is fed toward the photosensitive drum 28Y by a rotation operation of the second developing sleeve 34, and develops the electrostatic latent image formed on the photosensitive drum 28Y. After the electrostatic latent image formed on the photosensitive drum 28Y is developed with the developer, the developer remaining on the second developing sleeve 34 is fed to the neighborhood of the peeling roller 32 by the rotation operation of the second developing sleeve 34. Then, in the neighborhood of a closest position between the second developing roller 31 and the peeling roller 32, the developer is delivered from the second developing sleeve 34 to a peeling sleeve 35 of the peeling roller 32 by a magnetic field generated by the second developing magnet 37 included in the second developing roller 31 and by the peeling magnet 38 included in the peeling roller 32.

The peeling roller 32 is provided on a side opposite from the photosensitive drum 28Y with respect to the rotation center of the second developing sleeve 34 and peels off, from the second developing roller 31, the developer after the electrostatic latent image on the photosensitive drum 28Y is developed by the second developing roller 31. Specifically, the peeling roller 32 is a developer carrying member which is rotationally driven, and is provided between the second developing roller 31 and the developer collecting screw 44 so that a rotation center thereof is positioned above the rotation center of the second developing roller 31.

Further, the peeling roller 32 is disposed so that a rotational axis thereof is substantially parallel to a rotational axis of the second developing roller 31. Such a peeling roller 32 includes a peeling sleeve 35 which is rotatable, and the peeling magnet (fixed magnet) 38 non-rotationally provided inside the peeling sleeve 35 and for attracting the developer to a surface of the peeling sleeve 35 by a magnetic force, and is constituted so that the developer is delivered from the second developing roller 31 thereto on the basis of the magnetic force.

The peeling sleeve 35 is a non-magnetic cylindrical member and is rotationally driven about a rotation shaft 41. A rotational direction of the peeling sleeve 35 is the counterclockwise direction as indicated by an arrow in FIG. 2, and is a direction opposite to the rotational direction of the second developing sleeve 34 in this embodiment. For this reason, the peeling sleeve 35 and the second developing sleeve 34 rotate in the same direction (forward direction) at mutually opposing positions (opposing portion).

The peeling magnet 38 is disposed inside the peeling sleeve 35 and includes a plurality of magnetic poles 301 to 305, Between an inner periphery of the peeling sleeve 35 and an outer periphery of the peeling magnet 38, a space permitting rotation of the peeling sleeve 35 is provided.

The developer attracted to the peeling sleeve 35 is fed to a downstream side of the rotational direction by a rotation operation of the peeling sleeve 35 and is peeled off from the peeling sleeve 35 at a position close to the developer collecting screw 44 by the peeling magnet 38 included in the peeling roller 32, so that the developer is dropped toward a guiding member 45 positioned below with respect to the vertical direction, by a self-weight thereof. Then, the developer dropped on the guiding member 45 is guided toward the developer collecting screw 44 by its own weight.

The guiding member 45 and the developer collecting screw 44 constitute a developer collecting portion 47 as a collecting portion for collecting the developer peeled off from the peeling sleeve 35 on the peeling roller 32. In the developer collecting portion 47, the developer collecting screw 44 is positioned below a rotation center of the peeling roller 32 in the vertical direction, and feeds the developer delivered (collected) from the peeling roller 32, while stirring the developer.

The guiding member 45 as a guiding portion is disposed below the rotation center of the peeling roller 32 with respect to the vertical direction, and guides the developer, peeled off by the peeling roller 32, toward the developer collecting screw 44. Such a guiding member 45 is provided with an inclined surface 45*a* along which the developer slides down by its own weight in order to reliably guide the peeled developer toward the developer collecting screw 44. The inclined surface 45*a* is inclined with respect to a horizontal direction so that a position thereof on the developer collecting screw 44 side is lower than a lower position of the peeling roller 32.

The developer collecting screw 44 as a collecting portion and a feeding portion feeds the collected developer to a developer circulating portion 46 described below. That is, the developer collecting screw 44 is a screw feeding member used for feeding the developer, collected by being slide down along the inclined surface 45*a* of the guiding member 45, in one direction while stirring the developer.

The developer circulating portion 46 is a supplying portion for supplying the developer to the first developing roller 30, and includes a regulating member 50, the developer supplying screw 42, and the developer stirring screw 43. In the developer circulating portion 46, the developer is supplied to the first developing roller 30 while the developer is fed in the substantially horizontal direction while being stirred in the developer supplying screw 42 and the developer stirring screw 43. Further, as described above, the developer collected by the developer collecting portion 47 is dropped by its own weight and is guided to the developer circulating portion 46. That is, the developer circulating portion 46 is positioned below the developer collecting portion 47 with respect to the vertical direction.

The developer supplying screw 42, the developer stirring screw 43, and the developer collecting screw 44 are screw feeding members for feeding the developer in one direction while stirring the developer, and the developer supplying screw 42 and the developer stirring screw 43 are positioned below the developer collecting screw 44 with respect to the vertical direction. Further, the developer supplying screw 42, the developer stirring screw 43, and the developer collecting screw 44 are disposed so that their rotational axes are substantially parallel to each other. The rotational axes of these screws are also substantially parallel to the rotational axis of the first developing roller 30.

The developer supplying screw 42 is positioned between the first developing roller 30 and the developer stirring screw 43, and between itself and the developer stirring screw 43, a partition wall 48 of the developing container 60 is provided. The partition wall 48 of the developing container 60 is extended along rotational axis directions of the developer supplying screw 42 and the developer stirring screw 43. The partition wall 48 is provided with a communication opening (not shown) for establishing communication between a first feeding path 61 along which the developer is fed by the developer supplying screw 42 and a second feeding pat 62 along which the developer is fed by the developer stirring screw 43 is provided.

The developer stirred by the developer collecting screw 44 passes through a communication opening (not shown) formed in a partition wall 63 of the developing container 60 positioned between the developer collecting screw 44 and the developer supplying screw 42 and then is dropped toward the developer supplying screw 42 by its own weight. Incidentally, the above-described guiding member 45 is formed integrally with the partition wall 63, and above the partition wall 63, the developer collecting screw 44 is disposed.

A position of the communication opening through which the developer stirred by the developer collecting screw 44 is dropped by its own weight and is guided into the developer circulating portion 46 may preferably be disposed while avoiding a region (an intermediary portion with respect to the rotational axis direction of the developer supplying screw 42) in which the developer is supplied toward the first developing roller 30. In this embodiment, the position of the communication opening is a position where the communication opening position is included in a range of a downstream end portion (terminal portion) with respect to a developer feeding direction of the first feeding path 61 in which the developer supplying screw 42 is disposed.

Developer feeding directions of the developer supplying screw 42 and the developer stirring screw 43 are mutually opposite directions. Further, a starting end side (upstream end side in the developer feeding direction) and a terminal end side (downstream end side in the developer feeding direction) of the first feeding path 61 in which the developer supplying screw 42 is disposed, and a terminal end side and a starting end side of the second feeding path 62 in which the developer stirring screw 43 is disposed communicate with each other, respectively, via communication openings provided in the partition wall 48. Accordingly, the developer is circulated in the rotational directions of the developer supplying screw 42 and the developer stirring screw 43 indicated by arrows in FIG. 2 and in the substantially horizontal direction in the developing container 60, so that a part of the developer is supplied toward the first developing roller 30.

A developer supply opening 51 (sec FIG. 2) is provided above the developer stirring screw 43 in the developing container 60 and is connected to the developer storage portion 27Y (sec FIG. 1). Further, the developer supply opening 51 is constituted so as to be capable of supplying the developer, accommodated in a bottle mounted in the developer storage portion 27Y, to the second feeding path 62 in which the developer stirring screw 43 is disposed.

As described above, a toner weight ratio of the developer accommodated in the bottle of the developer storage portion 27Y is larger than a toner weight ratio of the developer in the developing device 1Y, and therefore, by adjusting an amount of the developer supplied to the developer stirring screw 43, the toner weight ratio of the developer in the developing device 1Y can be maintained at a certain level.

A toner concentration detecting sensor 49 (sec FIG. 2) is provided for detecting a toner concentration of the developer contained in the developer circulating portion 46. The toner concentration detecting sensor 49 is a sensor for detecting (magnetic) permeability. The toner concentration corresponds to a consumption amount of the toner in the developing device 1Y, and therefore, is utilized in control of supply of the developer from the developer storage portion 27Y. For example, when it is detected that the toner concentration became lower than a predetermined value, the developer is supplied from the developer storage portion 27Y. Incidentally, the permeability changes depending on the toner concentration, and therefore, by utilizing the permeability, it is possible to detect the toner concentration.

The regulating member 50 is disposed adjacent to the first developing roller 30 and is used for regulating an amount of the developer supplied from the developer circulating portion 46 to the first developing roller 30. The regulating member 50 can be constituted so as to regulate an amount of the developer attracted to the first developing roller 30, on the basis of a gap between the surface of the first developing sleeve 33 of the first developing roller 30 and an end portion of the regulating member 50.

A circulating path of the developer in the developing container 60 is such that the developer is fed in the substantially horizontal direction while being stirred in the developer circulating portion 46 and thereafter is supplied to the first developing roller 30, and then is delivered from the first developing roller 30 to the second developing roller 31 positioned above the first developing roller 30, on the basis of the magnetic force. Then, the developer is delivered from the second developing roller 31 to the peeling roller 32 positioned beside the second developing roller 31, on the basis of the magnetic force again, and thereafter, is peeled off from the peeling roller 32 by the peeling magnet 38 included in the peeling roller 32, and thereafter, the developer is collected by the developer collecting portion 47 and then is guided again into the developer circulating portion 46.

Further, as described above, in this embodiment, a two-component development type is used as a development type, and as the developer, a developer obtained by mixing non-magnetic toner having a negative charging property with a carrier having a magnetic property is used. The non-magnetic toner is toner obtained by containing a colorant, a wax component, and the like in a resin such as polyester or styrene-acrylic resin, by forming the mixture in powder through pulverization or polymerization, and then by adding fine powder of titanium oxide, silica, or the like to a surface the powder. The magnetic carrier is a carrier obtained by coating a resin material on a surface layer of a core comprising resin particles obtained by kneading ferrite particles or magnetic powder. The toner concentration in the developer (a weight ratio of the toner to the developer) in an initial state is 8% in this embodiment.

In general, the two-component development type using the toner and the carrier has a feature such that stress exerted on the toner is less than stress exerted on the toner in a one-component development type using a one-component developer because the toner and the carrier are charged to predetermined polarities by subjecting the toner and the carrier to triboelectric contact. On the other hand, by long-term use, an amount of a contaminant (spent) deposited on the carrier surface increases, and therefore, toner charging capacity gradually lowers. As a result, problems of a fog and a toner scattering arise. Although an amount of the carrier accommodated in the developing device is increased in order to prolong a lifetime of the two-component developing device, this causes upsizing of the developing device, and therefore is not desirable.

In order to solve the above-described problems on the two-component developer, in this embodiment, an ACR (auto carrier refresh) type is employed.

The ACR type is a type such that an increase in amount of a deteriorated developer is suppressed by not only supplying a fresh developer little by little from the developer storage portion 27Y into the developing device 1Y but also discharging the developer, deteriorated in charging performance, little by little through a discharge opening (not shown) of the developing device 1Y. By this, the deteriorated carrier in the developing device 1Y is replaced with a fresh carrier, so that the charging performance of the carrier in the developing device 1Y can be maintained at an approximately constant level.

In the thus-constituted developing device 1Y of this embodiment, the developer in the first feeding path 61 is supplied to the first developing sleeve 33 by the developer supplying screw 42, and the developer supplied to the first developing sleeve 33 forms a developer storing portion by being carried in a predetermined amount on the first developing sleeve 33 by a magnetic field generated by the first developing magnet 36. The two-component developer on the first developing sleeve 33 passes through the developer storing portion by rotation of the first developing sleeve 33 and is coated by the regulating member 50 in a thin layer on the surface of the first developing sleeve 33, and then is fed toward the developing region opposing the photosensitive drum 28Y. In the developing region, the developer on the first developing sleeve 33 is erected and thus forms the magnetic chains.

In the first developing region where the first developing sleeve 33 and the photosensitive drum 28Y oppose each other, by the developing bias applied to the first developing sleeve 33, the electrostatic latent image formed on the photosensitive drum 28Y is visualized. In this embodiment, as the developing bias applied to the first developing sleeve 33, a waveform in which both an AC electric field and a DC electric field are superimposed is applied, but a developing bias consisting only of the DC electric field may also be employed.

The two-component developer is delivered to the second developing sleeve 34 in a position close to the second developing sleeve 34 after being subjected to the developing step in the first developing region, and then is fed toward a second developing region where the second developing sleeve 34 and the photosensitive drum 28Y oppose each other. In the second developing region, a developing bias which is the same as the developing bias in the first developing region is applied and toner insufficient for a potential of the electrostatic latent image on the photosensitive drum 28Y is supplemented by development, and the toner image is uniformly adjusted by collecting the toner. Here, as regards the developing bias applied to the first developing sleeve 33 and the developing bias applied to the second developing sleeve 34, biases different in waveform may be applied.

Then, the developer passed through the second developing region is peeled off in a peeling magnetic region formed by the second developing magnet 37 included in the second developing sleeve 34. The developer peel off from the second developing sleeve 34 is attracted to the surface of the peeling sleeve 35 by a magnetic field formed by the peeling magnet 38 included in the peeling sleeve 35 of the peeling roller 32, and then the developer is fed along the rotational direction of the peeling sleeve 35. Then, the developer is detached from the surface of the peeling sleeve 35 by a peeling magnetic field formed by the peeling magnet 38 and is collected to the developer collecting portion 47.

[Magnetic Poles of Magnets]

Figure 4:
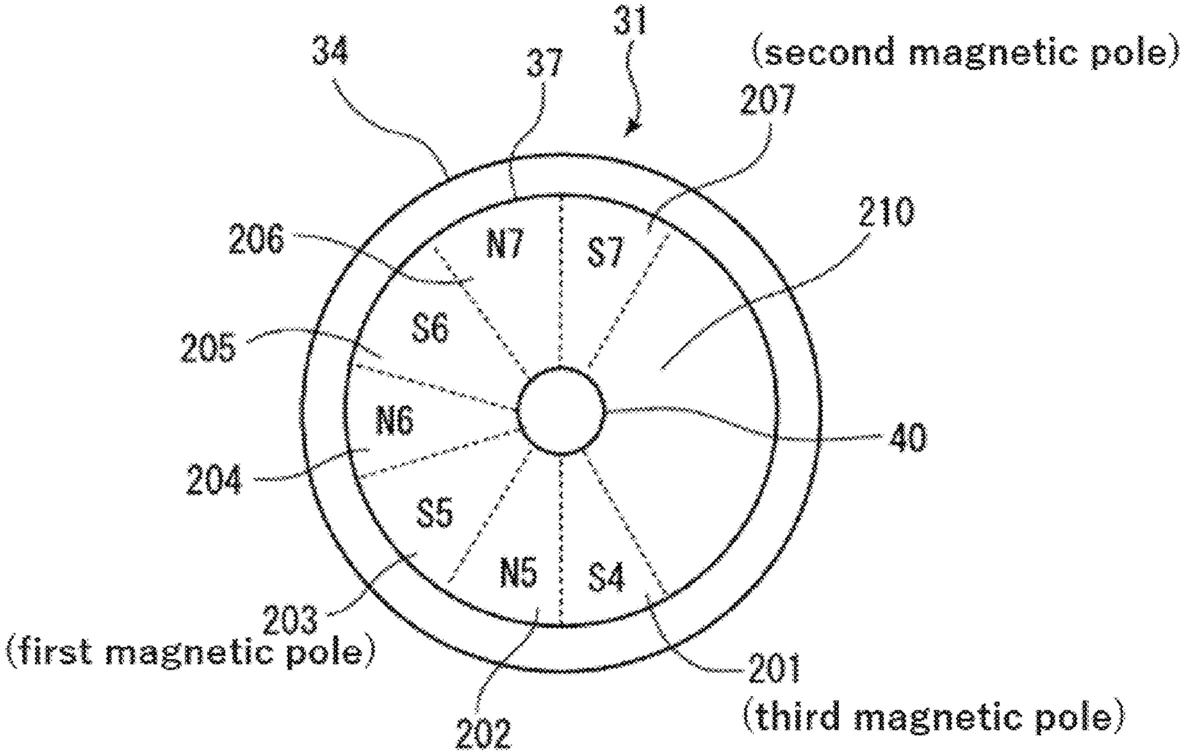
FIG. 4 is a schematic view showing a magnetic pole arrangement of a second developing roller in the first embodiment.
Figure 5:
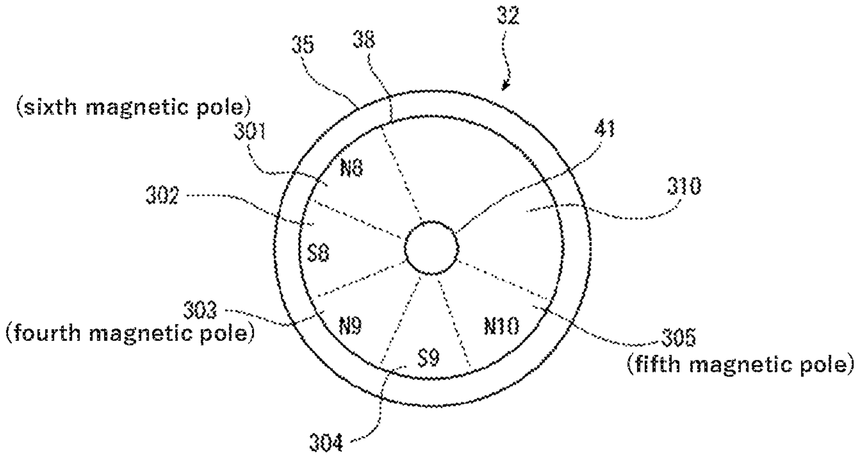
FIG. 5 is a schematic view showing a magnetic pole arrangement of a peeling roller in the first embodiment.

Next, magnetic pole constitutions of the first magnet 36, the second magnet 37, and the peeling magnet 38 included in the first developing roller 30, the second developing roller 31, and the peeling roller 32, respectively, which are shown in FIGS. 3, 4, and 5, respectively, will be described.

As shown in FIG. 3, the first developing magnet 36 included in the first developing roller 30 includes magnetic poles 101(S1), 102(N2), 103(S2), 104(N3), 105(S3), 106 (N4), and 107(N1) ("S" and "N" in parentheses show that associated magnetic pole are S pole and N pole, respectively, and reference numerals are added for distinction from other magnetic poles. The same applies to FIGS. 4 and 5). The magnetic pole 106 of these magnetic poles is a delivering pole for delivering the developer from the first developing roller 30 to the second developing roller 31. The magnetic poles 101 to 107 are disposed in numerical order in the rotational direction of the first developing sleeve 33.

The magnetic pole 106 is a magnetic pole for delivering the developer from the first developing sleeve 33 to the second developing sleeve 34 by a magnetic field generated in cooperation with the second developing magnet 37 of the second developing roller 31. Further, the magnetic pole 107 is N pole and is used for attracting the developer, supplied from the developer supplying screw 42, to the first developing sleeve 33. The magnetic poles 101, 102, 103, 104, and 105 are S pole, N pole, S pole, N pole, and S pole, and are used for feeding the developer, attracted by the magnetic pole 107, upward with rotation of the first developing sleeve 33. The magnetic pole 106 is N pole and delivers the developer from the first developing sleeve 33 to the second developing sleeve 34 opposing the first developing sleeve 33 by a magnetic field generated in cooperation with the magnetic pole 201 in the second developing magnet 37 included in the second developing roller 31 as described above.

Further, in this embodiment, a low magnetic force portion 110 lower in magnetic force than the magnetic pole 106 is formed by a repelling magnetic field generated in cooperation between the magnetic pole 106 and the magnetic pole 107 which is disposed on a side downstream of the magnetic pole 106 with respect to the rotational direction of the first developing sleeve 33 and which has the same polarity as the magnetic pole 106. By this low magnetic force portion 110, deliver of the developer from the first developing sleeve 33 to the second developing sleeve 34 is promoted. Incidentally, the low magnetic force portion 110 has substantially no magnetic force in this embodiment, but may have a low magnetic force, and for example, a magnetic force (normal component Br of a magnetic flux density) thereof may also be a magnetic pole with a magnetic force of 5 mT or less. This is also true for a low magnetic force portion 210 of the second developing magnet 37 shown in FIG. 4, and a low magnetic force portion 310 of the peeling magnet 38 shown in FIG. 5.

As shown in FIG. 4, the second developing magnet 37 included in the second developing roller 31 includes magnetic poles 201(S4), 202(N5), 203(S5), 204(N6), 205(S6), 206(N7), and 207(N7). The magnetic pole 201 of these magnetic poles is a receiving pole for receiving the developer from the first developing roller 30 by the second developing roller 31. The magnetic poles 201 to 207 are disposed in numerical order in the rotational direction of the second developing sleeve 34.

The magnetic pole 201 is a magnetic pole for attracting the developer from the first developing sleeve 33 to the second developing sleeve 34 by a magnetic field generated in cooperation with the magnetic pole 107 of the first developing magnet 36 of the first developing roller 30. The magnetic pole 207 is a magnetic pole for delivering the developer from the second developing sleeve 34 to the peeling sleeve 35 by a magnetic field generated in cooperation with the peeling magnet 38 of the peeling roller 32, and is hereinafter referred to as a delivering pole 207 in some cases.

Further, the magnetic pole 201 is S pole different in polarity from the magnetic pole 106 and is used for attracting the developer from the first developing roller 30 (first developing sleeve 33) to the second developing sleeve 34 as described above. The magnetic poles 202, 203, 204, 205, and 206 are N pole, S pole, N pole, S pole, and N pole, and are used for feeding the developer, attracted by the magnetic pole 201, upward with rotation of the second developing sleeve 34. The magnetic pole 207 as the delivering pole is S pole and delivers the developer, after passing through the developing region with the photosensitive drum 28Y corresponding to the magnetic pole 203, from the second developing sleeve 34 to the peeling sleeve 35 opposing the second developing sleeve 34 by a magnetic field generated in cooperation with the magnetic pole 303 in the peeling magnet 38 included in the peeling roller 32.

Further, in this embodiment, a low magnetic force portion 210 lower in magnetic force than the magnetic pole 207 is formed by a repelling magnetic field generated in cooperation between the magnetic pole 201 and the magnetic pole 207 which is disposed on a side upstream of the magnetic pole 201 with respect to the rotational direction of the second developing sleeve 34 and which has the same polarity as the magnetic pole 201. By this low magnetic force portion 210, deliver of the developer from the first developing sleeve 33 to the second developing sleeve 34 is promoted. Further, by the low magnetic force portion 210, it is possible to prevent attraction of the developer to the closest portion between the first developing sleeve 33 and the second developing sleeve 34, so that it is possible to suppress pressure exerted on the developer.

As shown in FIG. 5, the peeling magnet 38 included in the peeling roller 32 includes a plurality of magnetic poles 301(N8), 302(S8), 303(N9), 304(S9), and 305(N10). The magnetic poles 301 to 305 are disposed in numerical order in the rotational direction of the peeling sleeve 35.

The magnetic pole 303 as a receiving pole is a magnetic pole for attracting the developer from the second developing sleeve 34 to the peeling sleeve 35 by a magnetic field generated in cooperation with the magnetic pole 207 of the second developing magnet 37 of the second developing roller 31, and is hereinafter referred to as a receiving pole 303(N9) in some cases.

The magnetic pole 303 is an N pole different in polarity from the magnetic pole 207 and is used for attracting the developer, peeled off from the second developing sleeve 34 as described above, to the peeling sleeve 35. The magnetic poles 301, 302, and 304 are an N pole, an S pole, and an S pole are used for feeding the developer on the peeling sleeve 35 with rotation of the peeling sleeve 35. Particularly, the magnetic pole 304 is used for feeding downward the developer attracted by the magnetic pole 303 with rotation of the peeling sleeve 35. The magnetic pole 305 is an N pole and is peeling pole used for peeling off the developer, attracted to the peeling sleeve 35, from the peeling sleeve 35 by a repelling magnetic field generated in cooperation with the magnetic pole 301 having the same pole. Between the magnetic poles 305 and 301, the low magnetic force portion 310 lower in magnetic force than the magnetic pole 305 is formed.

[Second Developing Roller and Peeling Roller]

Next, by using FIGS. 6 to 15, a relationship between the second developing roller 31 and the peeling roller 32 will be described. In order to form a high-quality image by using the developing device 1Y having the above-described constitution, when the developer is delivered the second developing roller 31 to the peeling roller 32, it is required that the developer is not left on the second developing roller 31. When there is a developer which is not collected by the peeling roller 32 while being carried on the second developing roller 31, the developer left on the second developing roller 31 is carried on the surface of the second developing roller 31 or is dropped downward, so that the developer is supplied to the first developing roller 30 before the developer is taken into a developer circulating path. As a result of this, the supplied developer has the influence on the T/D distribution of the developer carried by the first developing roller 30 and the second developing roller 31, so that there is a liability that a density fluctuation of the toner image after the development occurs.

Therefore, in this embodiment, a peak position P1 which is a position of a maximum value of a normal component of the magnetic flux density of the receiving pole 303 on the peeling sleeve 35 is positioned on a side downstream, with respect to the rotational direction of the peeling sleeve 35, a rectilinear line L1 connecting the rotation center of the second developing sleeve 34 and the rotation center of the peeling sleeve 35. That is, the peak position P1 of the magnetic flux density of the receiving pole 303(N9) for receiving the peeled developer from the second developing sleeve 34 and formed by the peeling magnet 38 is disposed downstream of the opposing portion, where the second developing roller 31 and the peeling roller 32 oppose each other, with respect to the rotational direction of the peeling roller 32. In the following, description will be made specifically.

As described above, the developer is delivered from the first developing sleeve 33 to the second developing sleeve 34 and then from the second developing sleeve 34 to the peeling roller 32 by a magnetic field formed by the first magnet 36, the second magnet 37, and the peeling magnet 38. In this embodiment, a magnetic pole constitution and a positional relationship between the second developing sleeve 34 and the peeling roller 32 are important.

Figure 6:
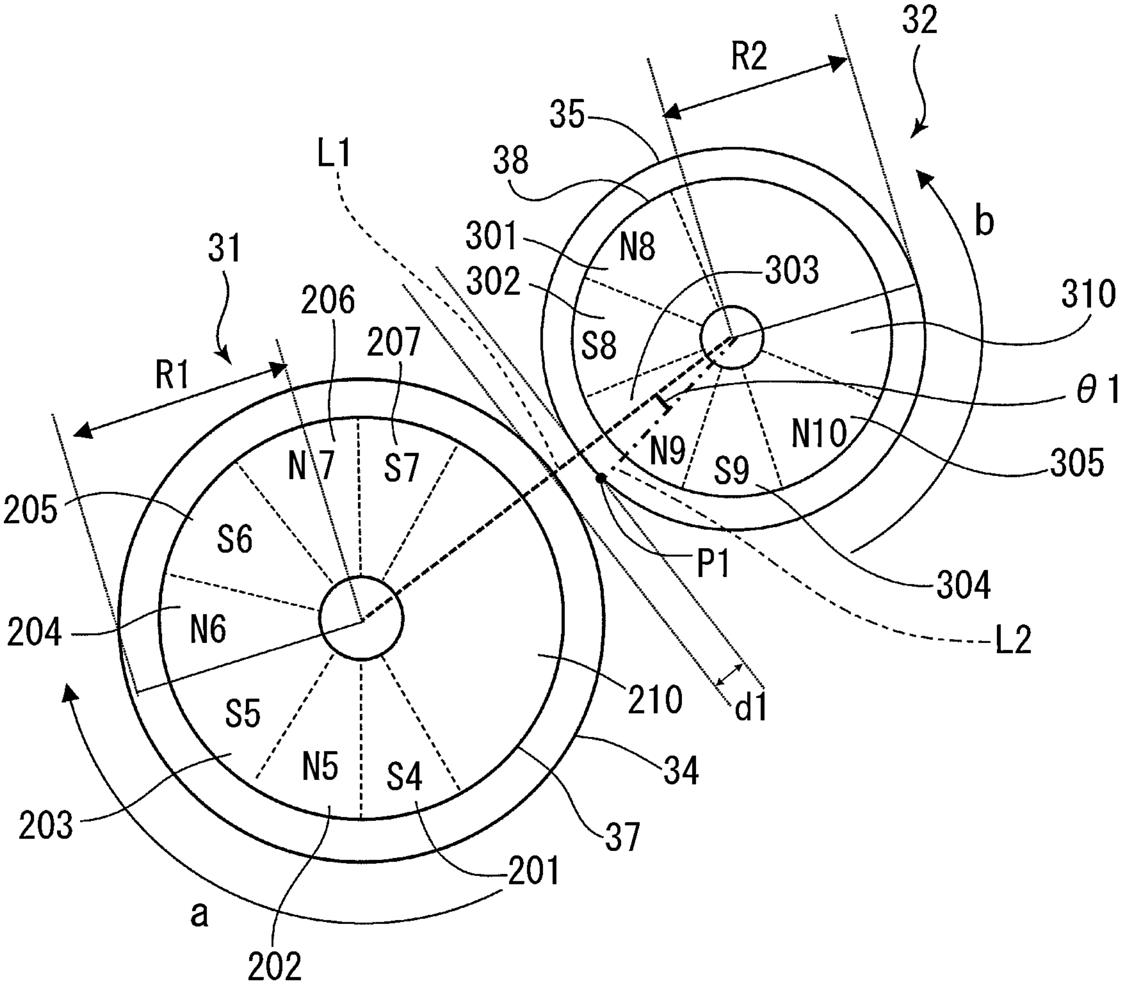
FIG. 6 is an enlarged view of the second developing roller, the peeling roller, and a periphery thereof in the first embodiment.

In FIG. 6, the magnetic pole constitution and the positional relationship between the second developing sleeve 34 and the peeling roller 32 in this embodiment are shown. R1 in FIG. 6 is a radius of the second developing roller 31 and is distance from the rotation center of the second developing sleeve 34 to the surface of the second developing sleeve 34. R2 is a radius of the peeling roller 32 and is a distance from the rotation center of the peeling roller 32 to the surface of the peeling sleeve 35.

In FIG. 6, d1 is a closest distance between the second developing roller 31 and the peeling roller 32 and is a distance between the surface of the second developing sleeve 34 and the surface of the surface of the peeling roller 32. In FIG. 6, L1 is the rectilinear line connecting the rotation center of the second developing sleeve 34 and the rotation center of the peeling sleeve 35. L2 is a rectilinear line connecting the peak position P1 of the magnetic flux density and the rotation center of the peeling sleeve 35 on the surface of the peeling sleeve 35 formed by the receiving pole 303(N9) of the peeling magnet 38. Θ1 is an angle formed between the rectilinear line L1 and the rectilinear line L2. In this embodiment, R1=12.5 mm, R2=12.5 mm, d1=2.6 mm, Θ1=10° are set.

By using FIG. 6, a state in which the developer is delivered from the second developing roller 31 onto the peeling roller 32 will be described. The developer carried on the second developing sleeve 34 of the second developing roller 31 is fed with rotation of the second developing sleeve 34 in an arrow a direction in FIG. 6. In the second developing region where the second developing roller 31 opposes the photosensitive drum 28Y, from the magnetic chain formed by the magnetic pole 203(S5) of the second developing magnet 37, the toner is filed and collected by the applied developing bias, so that the toner image on the photosensitive drum 28Y is uniformly adjusted.

Thereafter, the developer carried on the second developing sleeve 34 is fed with the rotation of the second developing sleeve 34 and reaches the neighborhood of the magnetic pole 207(S7) of the second developing magnet 37. As described above, the magnetic pole 207(S7) of the second developing magnet 37 in the second developing sleeve 34 and the magnetic pole 201(S4) on a side downstream of the magnetic pole 207 with respect to the rotational direction of the second developing sleeve 34 have the same polarity, and between the magnetic poles 207 and 201 (in the low magnetic force portion 210), a magnetic force for attracting the developer to the second developing sleeve 34 becomes weak.

On the other hand, the peeling magnet 38 in the peeling roller 32 opposing the second developing sleeve 34 is provided with the magnetic pole 303(N9) different in polarity from the magnetic pole 207(S7). For this reason, the developer weakened in magnetic force for being attracted to the second developing sleeve 34 while being fed with the rotation of the second developing sleeve 34 is moved from the second developing roller 31 toward the peeling roller 32 by a magnetic field formed by the magnetic pole 303 of the peeling magnet 38.

The developer moved to the peeling roller 32 is fed with rotation of the peeling sleeve 35 in an arrow b direction in FIG. 6 and reaches the neighborhood of the magnetic pole 305(N10) of the peeling magnet 38. The magnetic pole 305 of the peeling magnet 38 and the magnetic pole 301(N8) provided downstream of the magnetic pole 305 with respect to the rotational direction of the peeling sleeve 35 have the same polarity, and between the magnetic poles 305 and 301 (in the low magnetic force portion 310), a magnetic force attracting the developer to the peeling roller 32 becomes weak. When the developer is fed from the magnetic pole 305 with the rotation of the peeling sleeve 35, gravity acts on the developer in a direction in which the developer is peeled off from the peeling roller 32, so that the developer is collected into the developer collecting portion 47.

The state in which the developer is delivered from the second developing sleeve 34 to the peeling sleeve 35 will be described further specifically with reference to FIG. 7. The developer t in FIG. 7 forms a magnetic chain m along lines of magnetic flux formed by the magnetic poles of the second developing magnet 37 and the peeling magnet 38. In FIG. 8, a schematic view of the lines of magnetic flux formed by the magnetic poles of the second developing magnet 37 and the peeling magnet 38 is shown.

Figure 7:
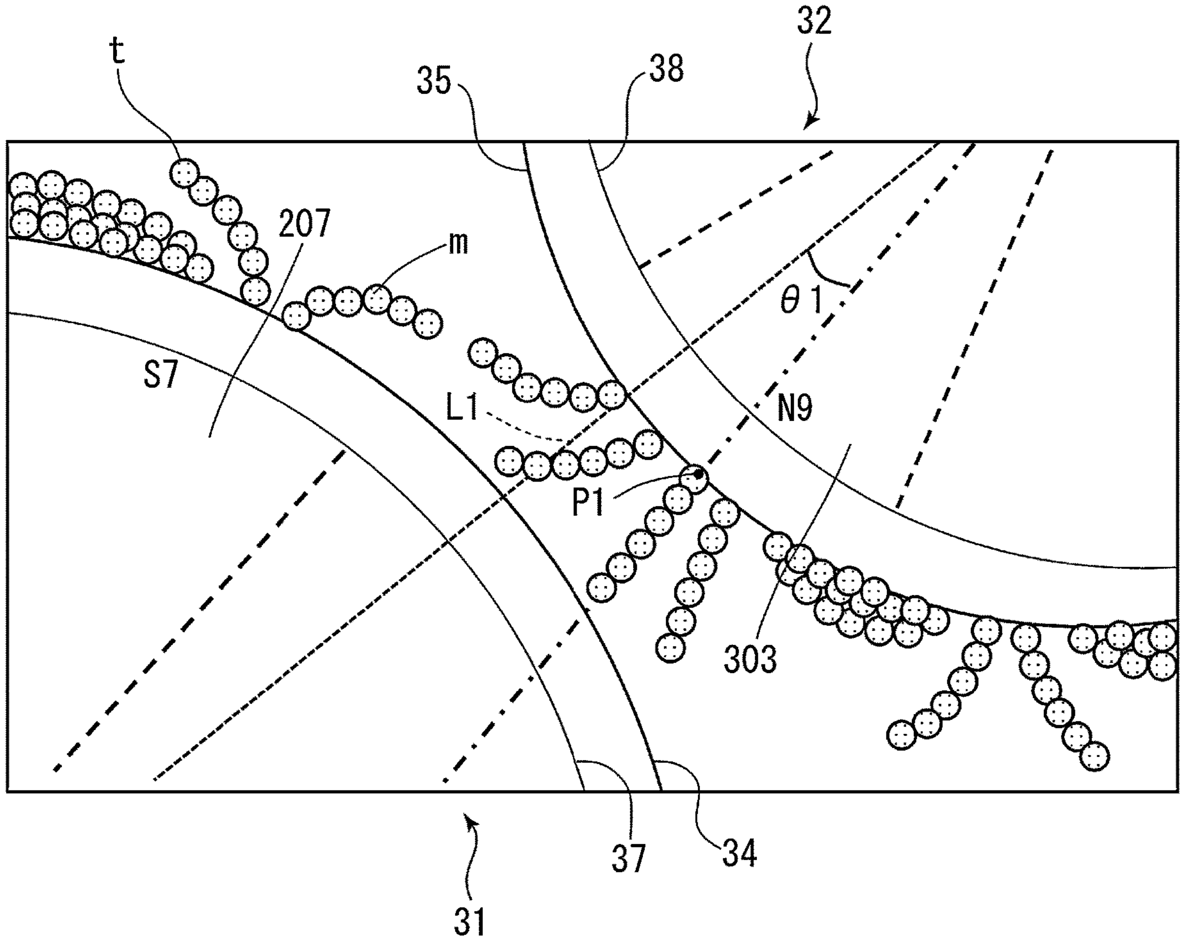
FIG. 7 is a schematic view showing a state of a delivery of a developer between the second developing roller and the peeling roller in the first embodiment.
Figure 8:
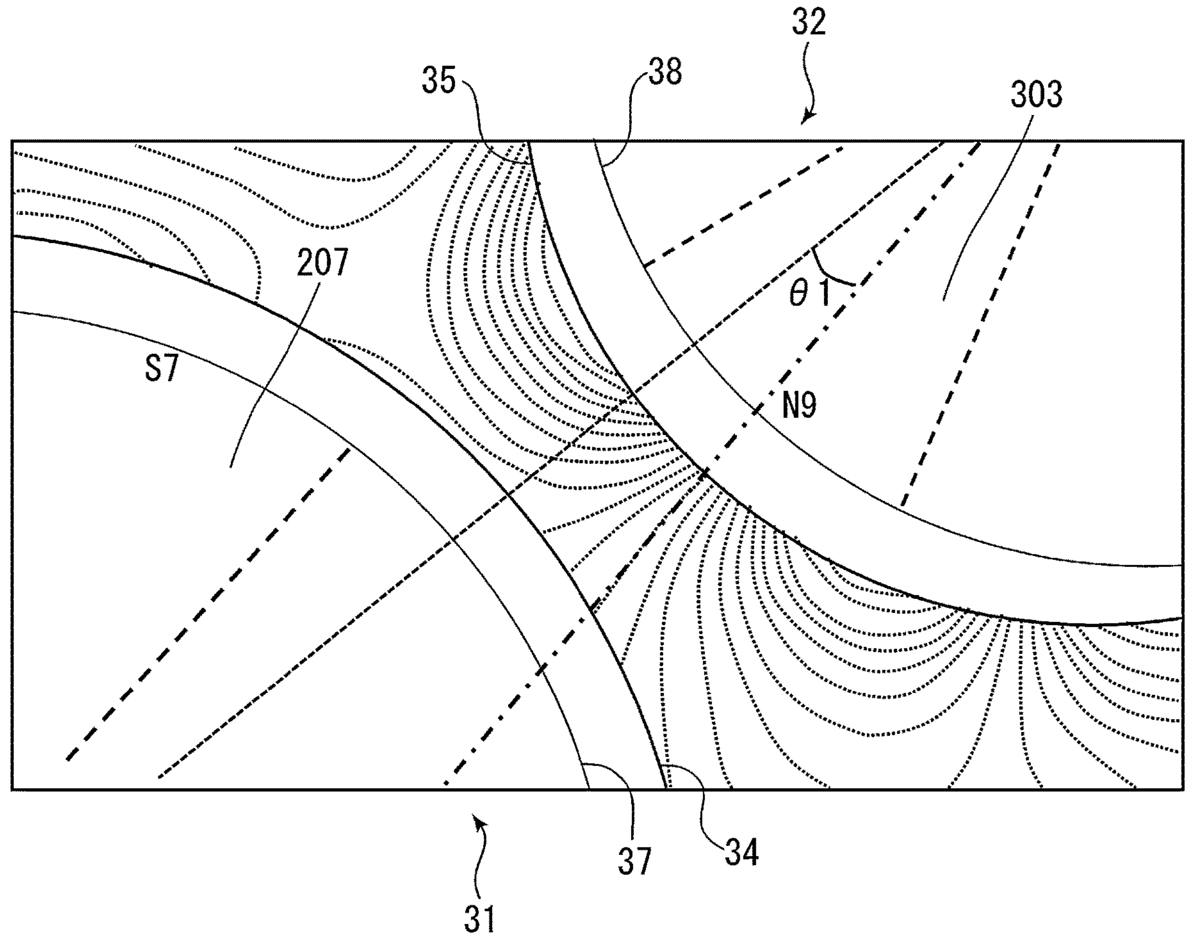
FIG. 8 is a schematic view showing lines of magnetic flux (induction) between the second developing roller and the peeling roller in the first embodiment.

In FIG. 7, the magnetic chain m formed on the second developing sleeve 34 by the magnetic pole 207(S7) of the second developing magnet 37 is fed to the opposing portion (position where the rectilinear line L1 passes) between the second developing sleeve 34 and the peeling roller 32 while falling along the lines of magnetic flux. In the opposing portion, the magnetic force for attracting the developer to the second developing sleeve 34 becomes weak, and therefore, the magnetic chain m is moved onto the peeling sleeve 35 by a magnetic field formed by the magnetic pole 303(N9) of the peeling magnet 38 in the peeling roller 32.

Here, in a comparison example 1 shown in FIG. 9, a magnetic pole constitution of a peeling magnet 38A inside a peeling roller 32A is as follows.

Figure 9:
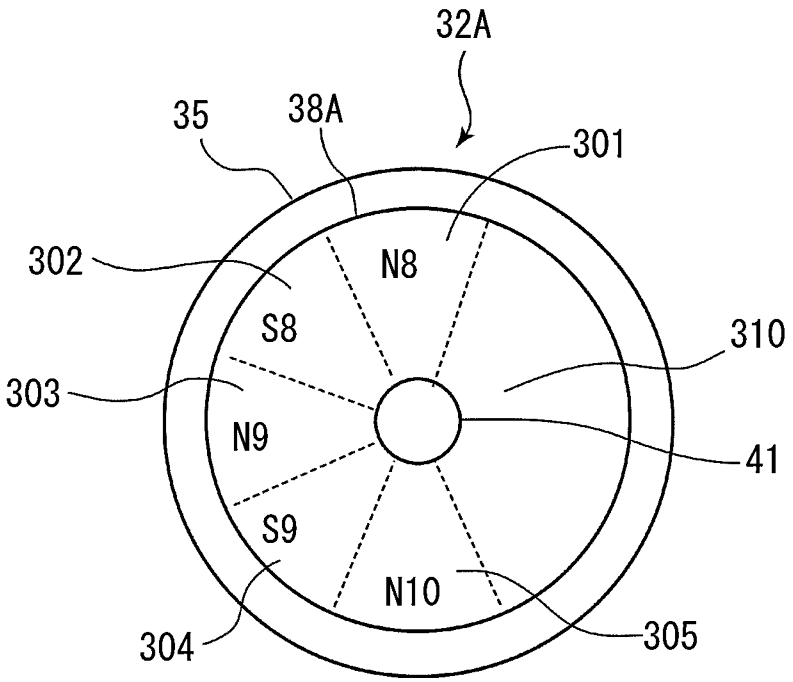
FIG. 9 is a schematic view showing a magnetic pole arrangement of a peeling roller in a comparison example 1.
Figure 10:
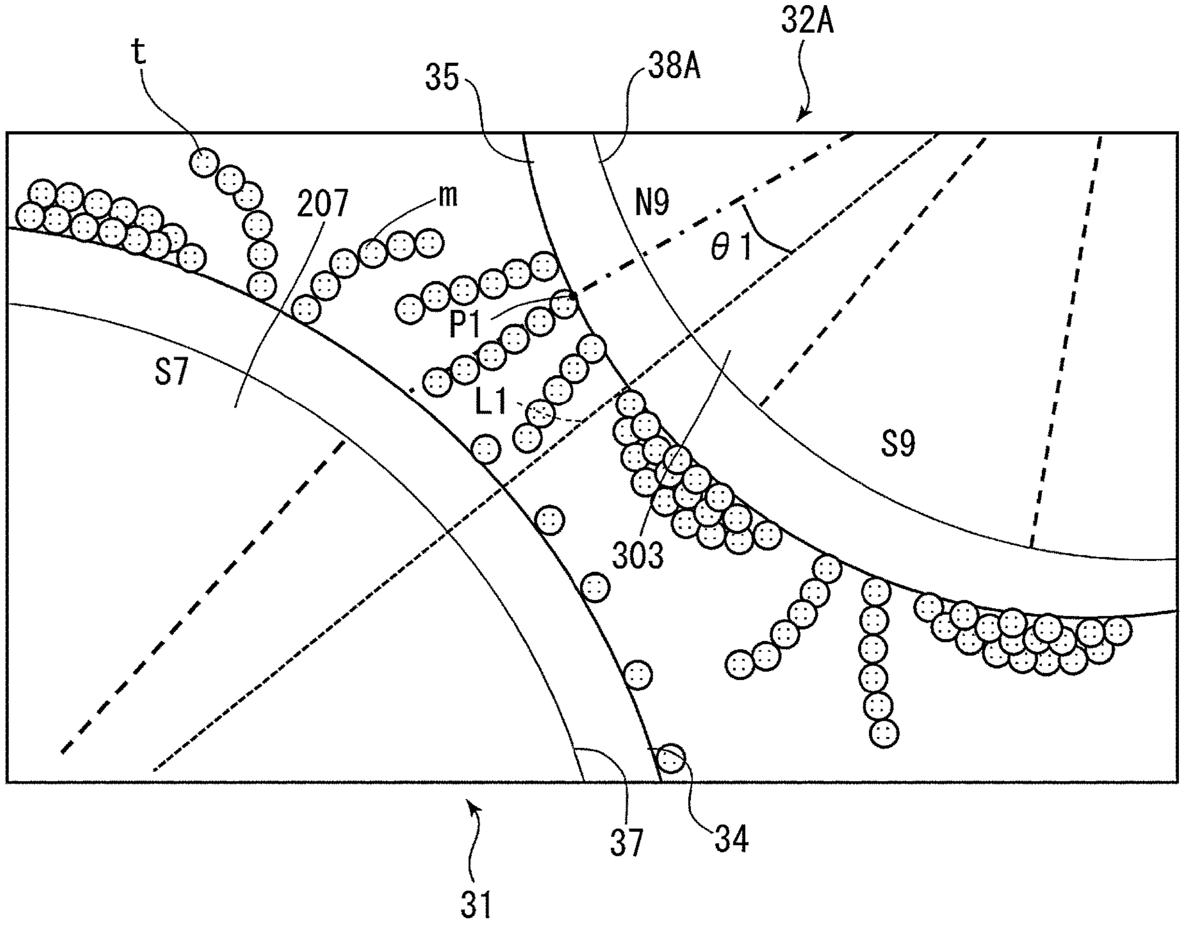
FIG. 10 is a schematic view showing a state of a delivery between a second developing roller and the peeling roller in the comparison example 1.

That is, as shown in FIGS. 9 and 10, peak position P1 of a magnetic flux density on a surface of a peeling sleeve 35 formed by a magnetic pole 303(N9) of the peeling magnet 38A is positioned upstream, with respect to the rotational direction of the second developing sleeve 34, an opposing portion (position where the rectilinear line L1 passes) between the second developing sleeve 34 and the peeling roller 32A. In the case of such a constitution, as shown in FIG. 10, when the developer is delivered from the second developing sleeve 34 to the peeling sleeve 35, an amount of the developer remaining on the second developing sleeve 34 becomes larger than an amount of the developer in the constitution of this embodiment (first embodiment). The reason therefor will be described in the following.

Figure 11:
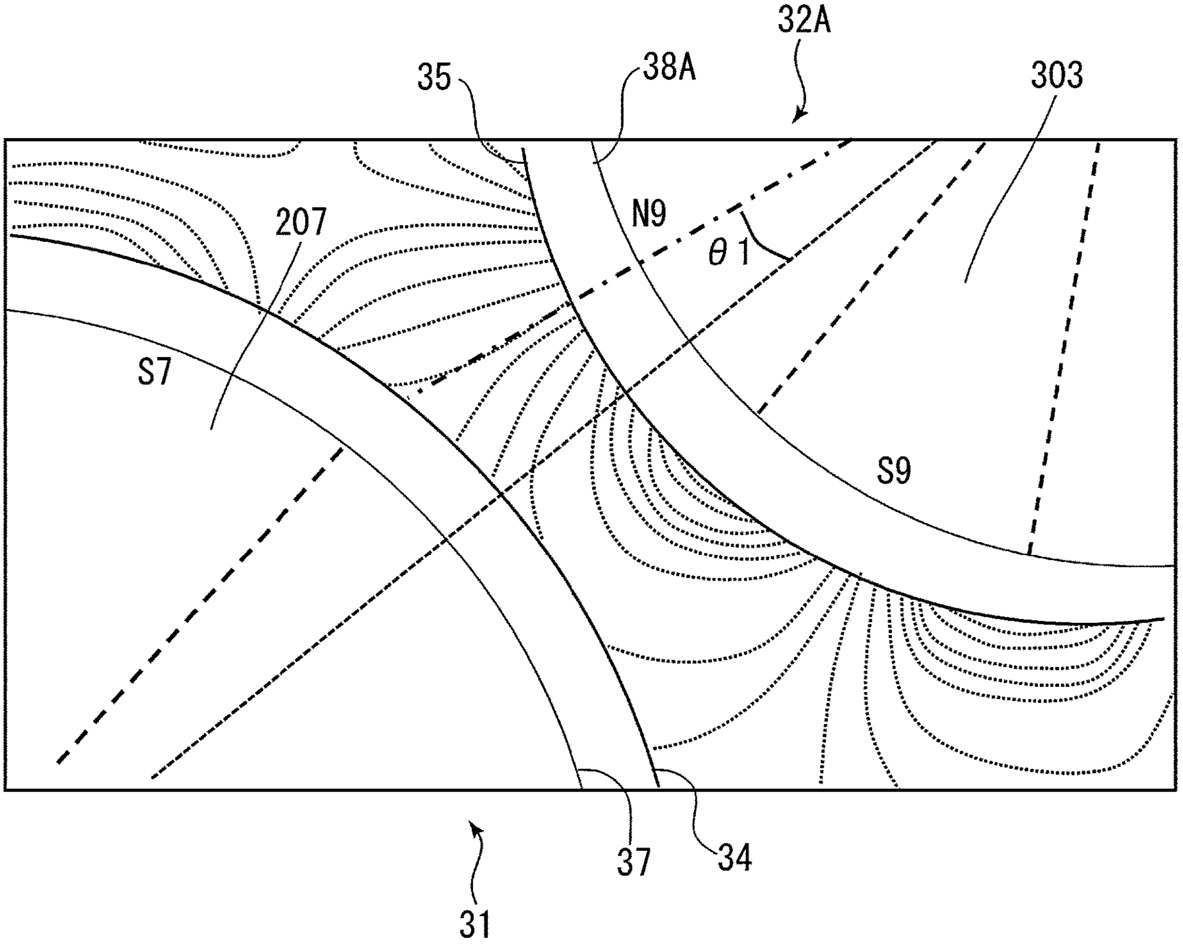
FIG. 11 is a schematic view showing lines of magnetic flux between the second developing roller and the peeling roller in the comparison example 1.

In the comparison example 1, the developer moved from the surface of the second developing sleeve 34 to the peeling sleeve 35 by the magnetic field formed by the magnetic pole 303 of the peeling magnet 38 in the peeling roller 32A forms the magnetic chain m by the magnetic field formed by the magnetic pole 303 as shown in FIG. 11 and moves toward the opposing portion (position where the rectilinear line L1 passes) between the second developing sleeve 34 an the peeling roller 32A. In the case of the comparison example 1, compared with a position where the developer is moved to the peeling sleeve 35, a downstream side of the rotational direction of the peeling sleeve 35 is closer to the opposing portion which is a closest position between the second developing sleeve 34 and the peeling sleeve 35. For this reason, a distance between the surface of the second developing sleeve 34 and the surface of the peeling sleeve 35 becomes close. Then, the magnetic chain m enters a narrower region, and therefore, an end of the magnetic chain m carried on the peeling roller 32A and the surface of the second developing sleeve 34 are liable to be compressed to each other.

Figure 12:
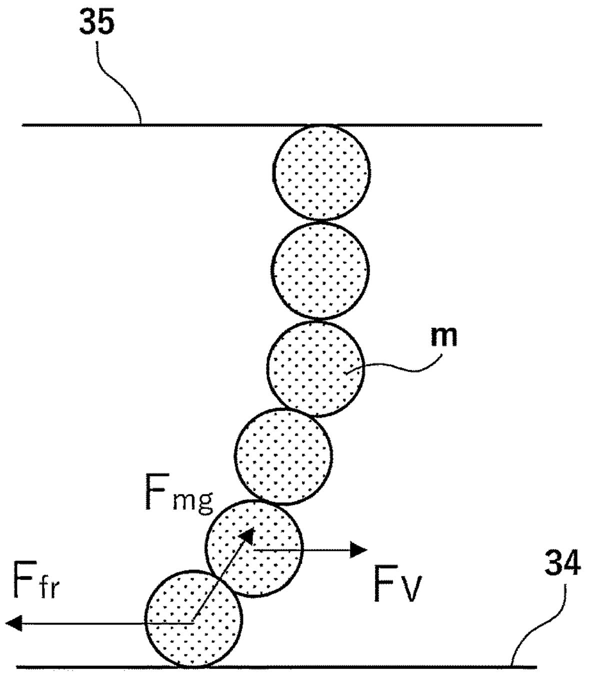
FIG. 12 is a schematic view showing a relationship between falling of a magnetic chain of the developer and friction between the magnetic chain and a developing sleeve.

When the end of the magnetic chain m carried on the peeling roller 32A and the surface of the second developing sleeve 34 are compressed to each other, as shown in FIG. 12, a frictional force Ffr acts, between the end of the magnetic chain m and the surface of the second developing sleeve 34, in a direction opposite to a direction of a force Fv by which the magnetic chain m falls along the lines of magnetic flux. When the magnetic force Ffr and the force Fv become larger than a magnetic binding force Fmg acting on the developer at the end of the magnetic chain m, the magnetic chain m is separated, so that the developer at the end of the magnetic chain m is liable to peeling on the surface of the magnetic chain m.

Further, the magnetic field formed by the magnetic pole 303 of the peeling magnet 38 in the peeling roller 32 is strong in force for attracting the developer thereto, and therefore, on a side downstream of the magnetic pole 303, a force by which the developer remains on the magnetic pole 303 against the rotation of the peeling roller 32, so that stagnation (accumulation) of the developer is liable to occur. When the developer stagnates and a density of the developer on the surface of the peeling roller 32 increases, the magnetic chain m formed by the magnetic pole 303 becomes longer. Then, the end of the magnetic chain m carried on the peeling roller 32 and the surface of the second developing sleeve 34 are liable to be compressed to each other, so that an amount of the developer remaining on the surface of the second developing sleeve 34 increases.

The developer remaining on the second developing sleeve 34 is carried by the surface of the second developing sleeve 34 or is dropped downward, so that the developer is supplied to the first developing roller 30 before being taken into the developer circulating path. For this reason, a distribution non-uniformity occurs in T/D of the developer carried by the first developing roller 30 and the second developing roller 31, so that a density fluctuation is caused to occur.

For this reason, in this embodiment, the magnetic pole (receiving pole) 303(N9) of the peeling magnet 38 is disposed downstream, with respect to the rotational direction of the second developing sleeve 34, of the opposing portion in the closest position between the second developing sleeve 34 and the peeling roller 32. Here, in the case of this embodiment, compared with the position where the developer is moved to the peeling sleeve 35, the downstream side of the rotational direction of the peeling sleeve 35 is remote from the opposing portion which is the closest position between the second developing sleeve 34 and the peeling sleeve 35. For this reason, a distance between the surface of the second developing sleeve 34 and the surface of the peeling roller 32 in a position where the magnetic chain m formed by the magnetic pole 303 contacts the second developing sleeve 34 is longer than that in the opposing portion between the second developing sleeve 34 and the peeling roller 32.

Then, the magnetic chain m formed by the magnetic pole 303 moves toward a wider region with rotation of the peeling sleeve 35, and therefore, contact pressure between the end of the magnetic chain m carried on the peeling sleeve 35 and the surface of the second developing sleeve 34 is alleviated compared with contact pressure in the case of the comparison example 1. For this reason, compared with the comparison example 1, the amount of the developer remaining on the surface of the second developing sleeve 34 can be suppressed.

Figure 13:
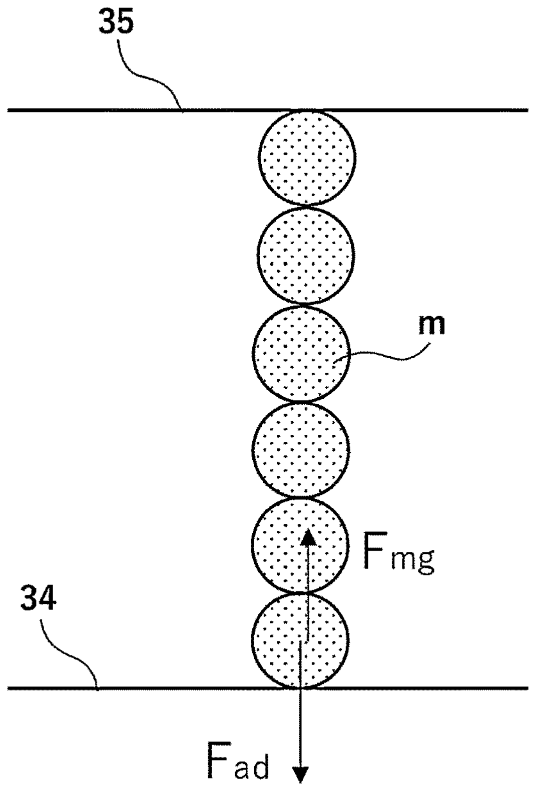
FIG. 13 is a schematic view showing a relationship of a depositing force between the magnetic chain of the developer and the developing sleeve with a magnetic binding force.

Further, by employing the constitution of this embodiment, also from the following viewpoint, the amount of the developer remaining on the surface of the second developing sleeve 34 can be suppressed. When the magnetic chain m is moved from the second developing sleeve 34 onto the peeling sleeve 35 by the magnetic field formed by the magnetic pole 303 of the peeling magnet 38 in the peeling roller 32, as shown in FIG. 13, between the second developing sleeve 34 and the developer of a base portion of the magnetic chain m contacted to the second developing sleeve 34, electrostatic and non-electrostatic depositing force Fad generates. Ordinarily, the depositing force Fad is smaller than the magnetic binding force Fmg generated between the developer particles constituting the magnetic chain m, but when a distance is generated between the developer particles by the influence of collision between the magnetic chains m or the like, the binding force Fmg abruptly becomes small. As a result, the depositing force Fad exceeds the binding force Fmg, so that the developer remains on the surface of the second developing sleeve 34 in some instances.

In such a case, when the end of the magnetic chain m carried on the peeling sleeve 35 passes through the neighborhood of the developer remaining on the surface of the second developing sleeve 34, a magnetic force generates between the remaining developer and the end of the magnetic chain m carried on the peeling sleeve 35, so that the developer remaining on the surface of the second developing sleeve 34 can be collected by the end of the magnetic chain m.

Therefore, as in this embodiment, by disposing the magnetic pole 303 of the peeling magnet 38 in the peeling roller 32 downstream of the opposing portion between the second developing sleeve 34 and the peeling sleeve 35 with respect to the rotational direction of the second developing sleeve 34, it is possible to suppress the amount of the developer remaining on the surface of the second developing sleeve 34.

Further, the position of the magnetic pole (receiving pole) 303(N9) of the peeling magnet 38 in the peeling roller 32 in this embodiment may preferably satisfy the following formula.

$$(R1+R2+d1)\times\sin(\Theta 1)<R1$$

Figure 14:
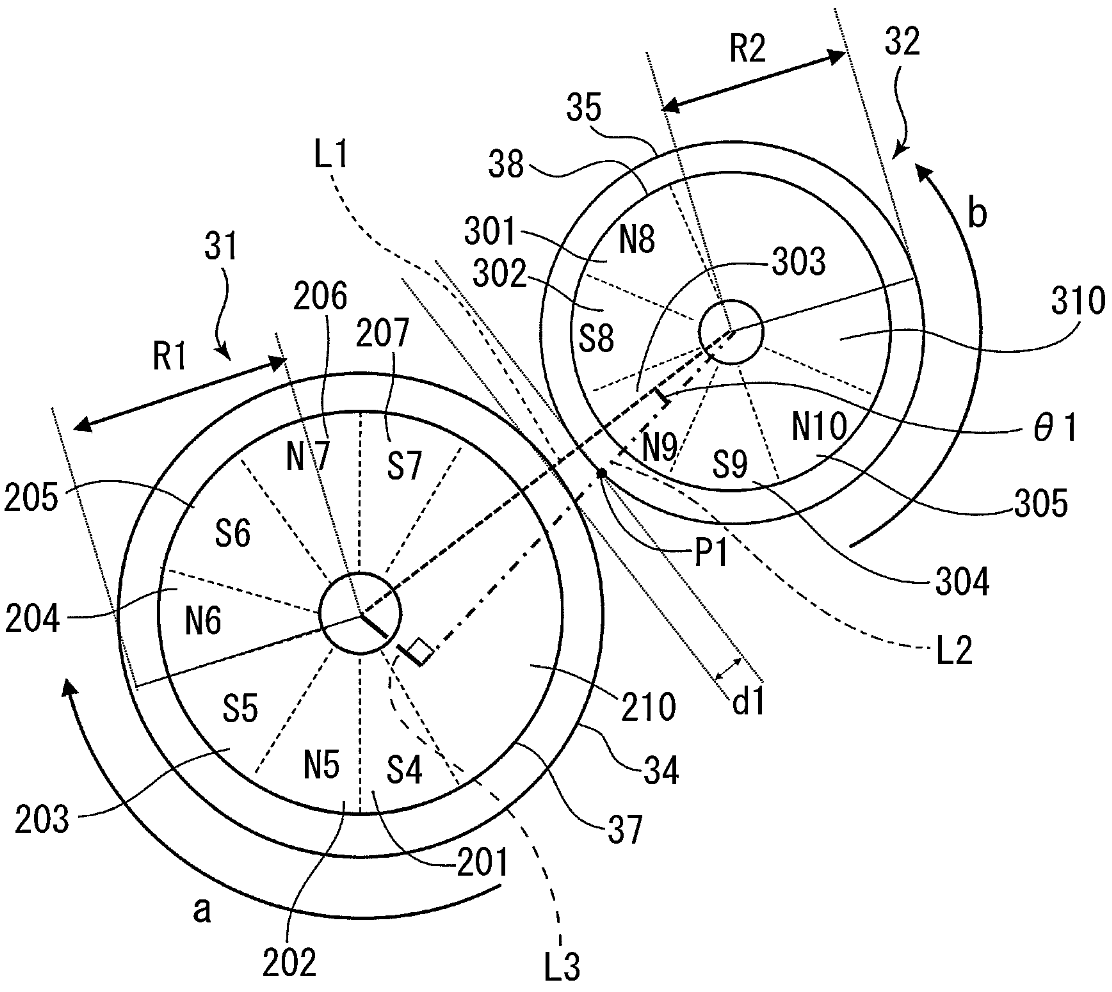
FIG. 14 is an enlarged view of the second developing roller, the peeling roller, and the periphery thereof for illustrating a positional relationship of receiving poles in the first embodiment.

In the following, the reason therefor will be described using FIGS. 14 and 15. FIG. 14 shows a magnetic pole constitution and a positional relationship between the second developing roller 31 and the peeling roller 32 in the case where the above formula is satisfied. A length of L1 in FIG. 14 can be represented by: $L1=R1+R2+d1$. A length of a line indicated by L3 in FIG. 14 can be represented by: $L3=(R1+R2+d1)\ x\ \sin(\Theta 1)$ by using $\sin(\Theta 1)$. when this L3 is smaller than a radius R1 of the second developing sleeve 34, a rectilinear line L2 has a point of intersection with the surface of the second developing sleeve 34. The rectilinear line L2 is a rectilinear line connecting the rotation center of the peeling sleeve 35 and the peak position P1 of the magnetic flux density, with respect to the rotational direction of the peeling sleeve 35, on the surface of the peeling sleeve 35 in the magnetic field formed by the magnetic pole 303 of the peeling magnet 38.

In the peak position P1 of the magnetic flux density, the magnetic force acting on the magnetic chain becomes strongest, and therefore, the peak position P1 is also a position where capacity for collecting the developer remaining on the surface of the second developing sleeve 34 by the end of the magnetic chain m formed by the magnetic pole 303 becomes strongest.

Figure 15:
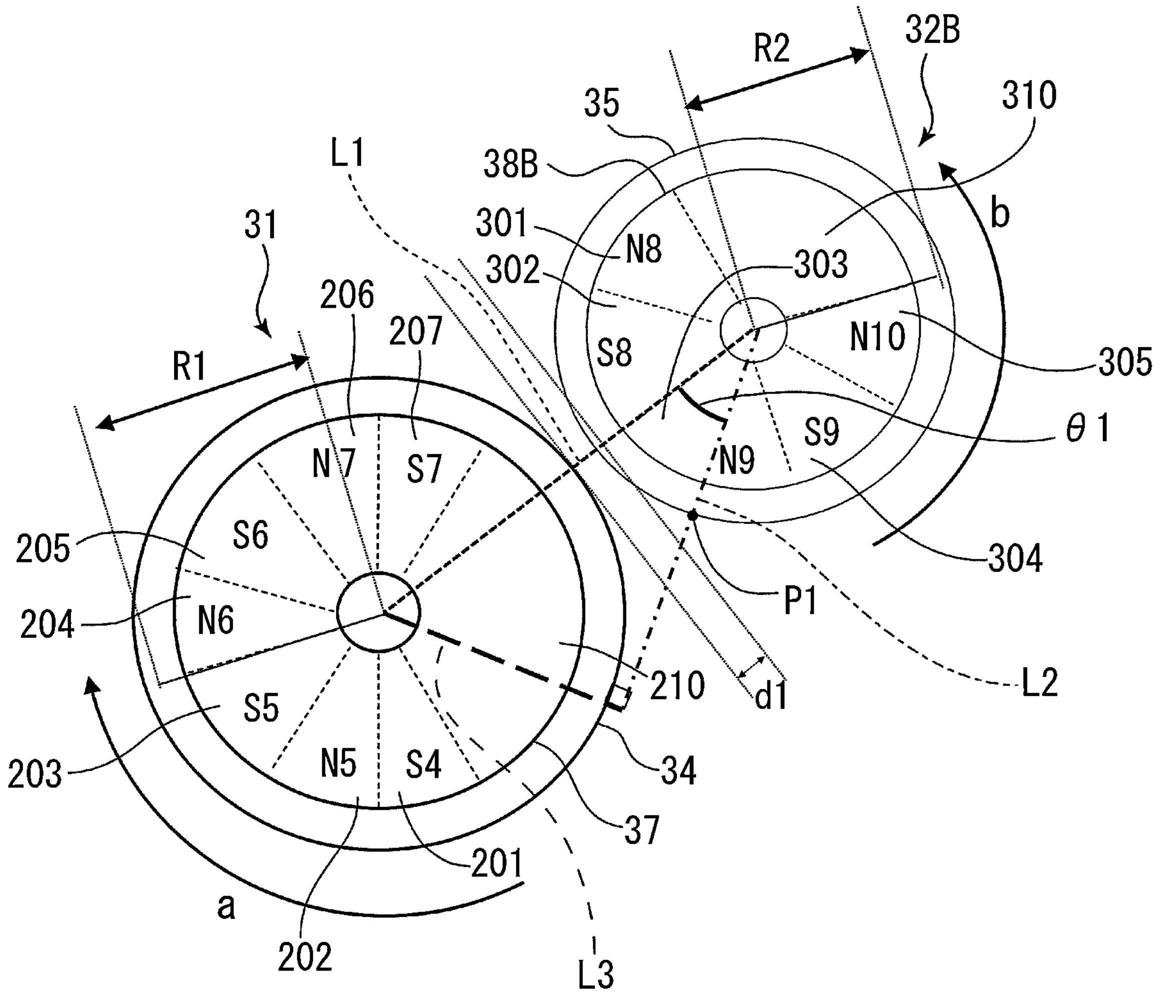
FIG. 15 is an enlarged view showing a second developing roller, a peeling roller, and periphery thereof for illustrating a positional relationship of receiving poles in a comparison example 2.

On the other hand, in FIG. 15, a constitution of a comparison example 2 in which a peeling magnet 38B which does not satisfy the above-described formula is shown. FIG. 15 shows the comparison example 2 in which a magnetic pole constitution and a positional relationship between the second developing sleeve 34 and a peeling roller 32B in this embodiment are satisfied. In the case of the comparison example 2, $L3=(R1+R2+d1)\ x\ \sin(91)$ is larger than the radius R1. For this reason, in a position where capacity for collecting the developer remaining on the surface of the second developing sleeve 34 by the end of the magnetic chain m formed by the magnetic pole 303 should become strongest the magnetic chain m is not directed to the surface of the second developing sleeve 34, so that the capacity for collecting the developer remaining on the surface of the second developing sleeve 34 lowers. For this reason, as in this embodiment, by satisfying the above-described formula, by the end of the magnetic chain m formed by the magnetic pole 303, the developer remaining on the surface of the second developing sleeve 34 can be more satisfactorily collected.

[Distance Between the Second Developing Sleeve and Peeling Sleeve]

Here, the closest distance d1 between the surface of the second developing sleeve 34 and the surface of the peeling sleeve 35 may preferably be 3 mm or less and 0.2 mm or more. When d1 is excessively long, a distance between the end of the magnetic chain carried on the peeling sleeve 35 and the developer remaining on the surface of the second developing sleeve 34 becomes long, and therefore, a magnetic force acting from the end of the magnetic chain onto the remaining developer becomes weak. For this reason, capacity for collecting the developer remaining on the surface of the second developing sleeve 34 by the end of the magnetic chain lowers.

On the other hand, when d1 is excessively short, a space between the surface of the second developing sleeve 34 and the surface of the second developing sleeve 35 becomes smaller than a volume of the developer, so that a part of the developer cannot pass through the closest portion between the second developing sleeve 34 and the peeling sleeve 35 and thus stagnates on a side upstream of the closest portion with respect to the rotational direction. The developer stagnating on the side upstream of the closest portion is rubbed with the surface of the second developing sleeve 34 and the surface of the peeling sleeve 35, so that toner spent such that the toner is fused on the carrier is liable to occur.

[Speeds of Second Developing Sleeve and Peeling Sleeve]

Here, a relationship between a speed of the second developing sleeve 34 and a speed of the peeling sleeve 35 will be described.

As described above, the peeling sleeve 35 and the second developing sleeve 34 rotate in the same direction (forward direction) in the position (opposing portion) where these sleeves oppose each other. In the case where a surface movement speed (linear speed) of the second developing sleeve 34 is v1 and the surface movement speed of the peeling sleeve 35 is v2, $v1<v2$ may preferably be satisfied. That is the linear speed of the surface of the second developing sleeve 34 may be equal to or slower than the linear speed of the surface of the peeling sleeve 35.

Even when the linear speed of the surface of the second developing sleeve 34 is slower than the linear speed of the surface of the peeling sleeve 35, on a side downstream of the opposing portion between the second developing sleeve 34 and the peeling sleeve 35, the end of the magnetic chain m carried on the peeling sleeve 35 is capable of passing through the neighborhood of the developer remaining on the surface of the second developing sleeve 34. For this reason, the developer remaining on the second developing sleeve 34 can be collected by the magnetic force from the end of the magnetic chain m. However, the number of ends of magnetic chains in passing through the neighborhood of the developer remaining on the surface of the second developing sleeve 34 becomes smaller with a slower linear speed of the second developing sleeve 34 relative to the linear speed of the peeling sleeve 35, and therefore, an amount of the developer, remaining on the surface of the second developing sleeve 34, collected by the ends of the magnetic chains m also lowers.

In this embodiment, the first developing sleeve 33 has the surface movement speed (linear speed) of 513 [mm/sec]

which is the same as that of the photosensitive drum 28Y, the surface movement speed v1 of the second developing sleeve 34 is 616 [mm/sec], and the surface movement speed v2 of the peeling roller 32 is 740 [mm/sec].

[Surface Shape of Peeling Sleeve]

The surface of the peeling roller 32 in this embodiment may preferably have an uneven shape. The uneven shape may be, for example, a shape such that a plurality of grooves are formed so as to be arranged is a circumferential direction or a shape formed by blasting. By providing the surface of the peeling sleeve 35 with the uneven shape, the developer on the peeling sleeve 35 can be fed more reliably toward a downstream side with rotation of the peeling sleeve 35. Further, the magnetic chains carried on the peeling sleeve 35 are capable of passing through the neighborhood of the developer remaining on the surface of the second developing sleeve 34, in a larger amount. As a result of this, the amount of the developer, remaining on the surface of the second developing sleeve 34, collected by the ends of the magnetic chains is increased, so that the amount of the developer remaining on the surface of the second developing sleeve 34 can be further suppressed.

As described above, in this embodiment, the receiving pole 303 which is for receiving the developer peeled off from the second developing roller 31 and which is formed by the peeling magnet 38 is disposed downstream, with respect to the rotational direction of the peeling sleeve 35, of the opposing portion between the second developing sleeve 34 and the peeling sleeve 35. By this, the developer can be sufficiently peeled off from the second developing sleeve 34 by the peeling sleeve 35, so that a degree of density non-uniformity due to carrying and movement of the developer by the second developing sleeve 34 can be reduced. As a result of this, an occurrence of an image defect can be suppressed.

Second Embodiment

A second embodiment will be described using FIG. 16. This embodiment is changed from the first embodiment in peak position P2 of a magnetic flux density of a delivering pole 207 of a second developing magnet 37A. Other constitutions and actions are similar to those in the first embodiment, and therefore, as regards similar constitutions, description and illustration are omitted or briefly made by adding the same reference numerals or symbols, and in the following, a difference from the first embodiment will be principally described.

Figure 16:
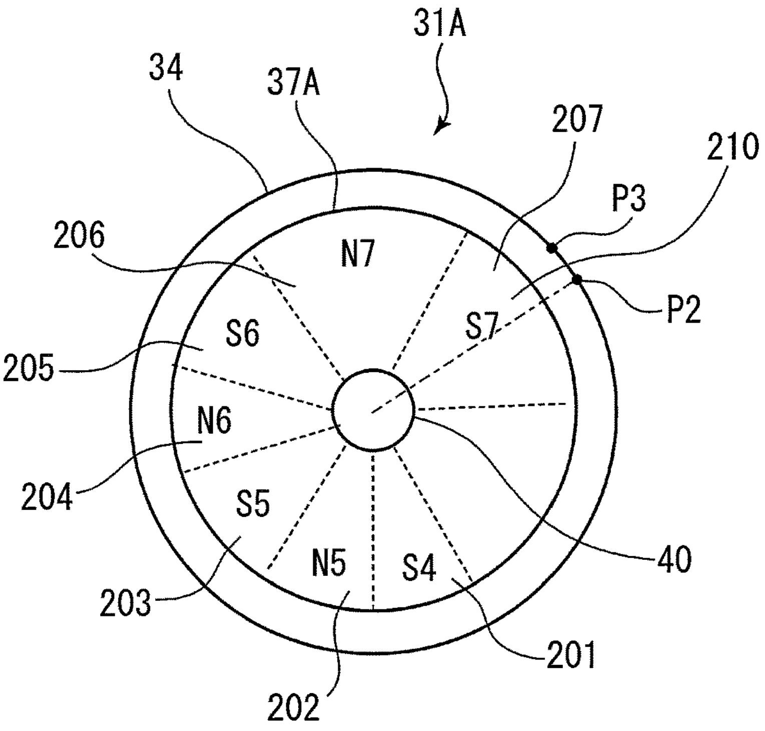
FIG. 16 is a schematic view showing a magnetic arrangement of a second developing roller in a second embodiment.

In FIG. 16, a magnetic pole arrangement of the second developing magnet 37A in a second developing roller 31A in this embodiment is shown. In this embodiment, the peak position P2 which is a position of a maximum value of a normal component o the magnetic flux density of the delivering pole 207(S7) on the second developing sleeve 34 is positioned on a side downstream, with respect to the rotational direction of the second developing sleeve 34, of the closest position P3 of the second developing sleeve 34 to the peeling sleeve 35. Incidentally, in the first embodiment, the peak position which is the position of the maximum value of the normal component of the magnetic flux density of the delivering pole 207(S7) on the second developing sleeve 34 was positioned on the side upstream, with respect to the rotational direction of the second developing sleeve 34, of the closest position of the second developing sleeve 34 to the peeling sleeve 35.

In this embodiment, as in the first embodiment, a receiving pole 303(N9) of the peeling magnet 38 is disposed downstream, with respect to the rotational direction of the peeling sleeve 35, of the opposing portion between the second developing sleeve 34 and the peeling sleeve 35. In addition thereto, the delivering pole 207(S7) of the second developing magnet 37A in the second developing sleeve 34 is disposed downstream, with respect to the rotational direction of the second developing sleeve 34, of the opposing portion (closest position P3) between the second developing sleeve 34 and the peeling sleeve 35.

Even in such a embodiment (this embodiment), compared with a position where the developer is moved onto the peeling sleeve 35, a downstream side of the rotational direction of the peeling sleeve 35 is remoter from the opposing portion between the second developing sleeve 34 and the peeling sleeve 35, and therefore, the distance between the surface of the second developing sleeve 34 and the surface of the peeling sleeve 35 becomes long. Then, the magnetic chain is directed toward a wider region, and therefore, there exists contact pressure between the surface of the second developing sleeve 34 and the end of the magnetic chain carried on the peeling sleeve 35.

For this reason, also in the case of this embodiment, it is possible to suppress the amount of the developer remaining on the surface of the second developing sleeve 34. On the other hand, in this embodiment, compared with the first embodiment, a distance in which the end of the magnetic chain carried on the peeling roller 32 stagnates in the neighborhood of the surface of the second developing sleeve 34 becomes short. For this reason, capacity for collecting the developer, remaining on the surface of the second developing sleeve 34, by the end of the magnetic chain becomes lower than the capacity in the first embodiment.

Third Embodiment

A third embodiment will be described using FIG. 17. This embodiment is changed from the first embodiment in peak position P2 of a magnetic flux density of a delivering pole 207 of a second developing magnet 37B. Other constitutions and actions are similar to those in the first embodiment, and therefore, as regards similar constitutions, description and illustration are omitted or briefly made by adding the same reference numerals or symbols, and in the following, a difference from the first embodiment will be principally described.

Figure 17:
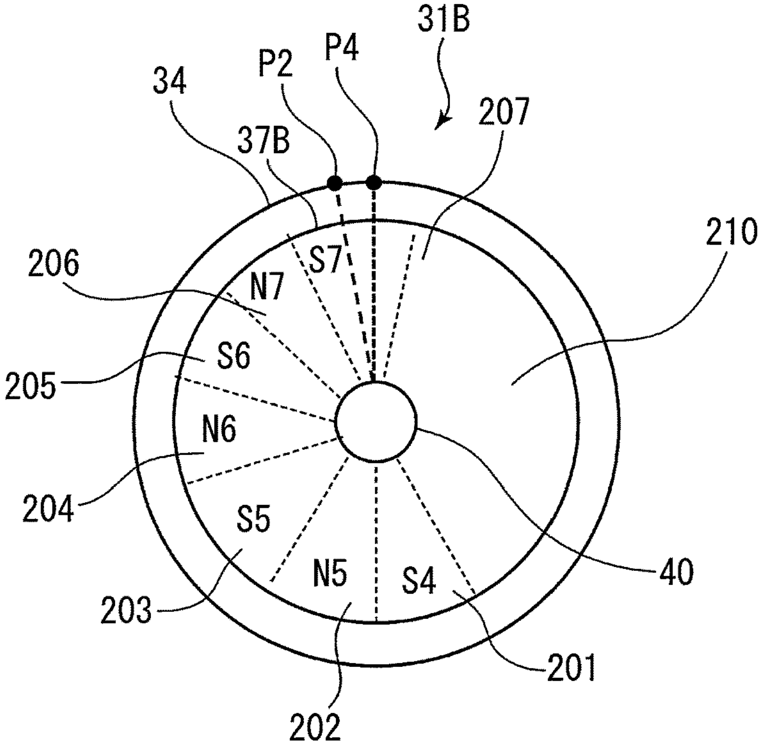
FIG. 17 is a schematic view showing a magnetic arrangement of a second developing roller in third embodiment.

In FIG. 17, a magnetic pole arrangement of the second developing magnet 37B in a second developing roller 31B in this embodiment is shown. In this embodiment, the peak position P2 which is a position of a maximum value of a normal component on the magnetic flux density of the delivering pole 207(S7) on the second developing sleeve 34 is positioned on a side upstream, with respect to the rotational direction of the second developing sleeve 34, of an uppermost position P4 of the second developing sleeve 34 with respect to the vertical direction. Incidentally, in the first embodiment, the peak position which is the position of the maximum value of the normal component of the magnetic flux density of the delivering pole 207(S7) on the second developing sleeve 34 was positioned on the side downstream, with respect to the rotational direction of the second developing sleeve 34, of the uppermost position of the second developing sleeve 34 in the vertical direction.

In this embodiment, as in the first embodiment, a receiving pole 303(N9) of the peeling magnet 38 is disposed downstream, with respect to the rotational direction of the peeling sleeve 35, of the opposing portion between the second developing sleeve 34 and the peeling sleeve 35. In addition thereto, the peak position P2, of the magnetic flux density on the surface of the second developing sleeve 34, formed by the delivering pole 207 of the second developing magnet 37B in the second developing sleeve 34 is positioned upstream, with respect to the rotational direction of the second developing sleeve 34 relative to the opposing portion between the second developing sleeve 34 and the peeling sleeve 35, of the uppermost position P4 on the surface of the second developing sleeve 34 in the vertical direction.

Even in this embodiment, similarly as in the first embodiment, contact pressure between the surface of the second developing sleeve 34 and the end of the magnetic chain carried on the peeling sleeve 35 is reduced, and therefore, it is possible to suppress the amount of the developer remaining on the surface of the second developing sleeve 34. On the other hand, on the developer fed on the second developing sleeve 34 and reached the peak position P2, gravity in a direction in which the developer is returned to the peak position P2 acts when the developer reaches the position P4. A force for feeding the developer by the second developing sleeve 34 is about 5 to 10 times the gravity acting on the developer, and therefore, the gravity cannot be ignored. For this reason, compared with the constitution of the first embodiment, the developer is liable to stagnate in the peak position P2, and contact between the second developing sleeve 34 and the developer occurs frequently between the peak position P2 and the position P4, so that the toner spent such that the toner is fused on the carrier is liable to occur.

Fourth Embodiment

A fourth embodiment will be described using FIGS. 18 to 20. This embodiment is changed from the first embodiment in arrangement of a second developing roller 31C and a peeling roller 32C. Other constitutions and actions are similar to those in the first embodiment, and therefore, as regards similar constitutions, description and illustration are omitted or briefly made by adding the same reference numerals or symbols, and in the following, a difference from the first embodiment will be principally described.

Figure 18:
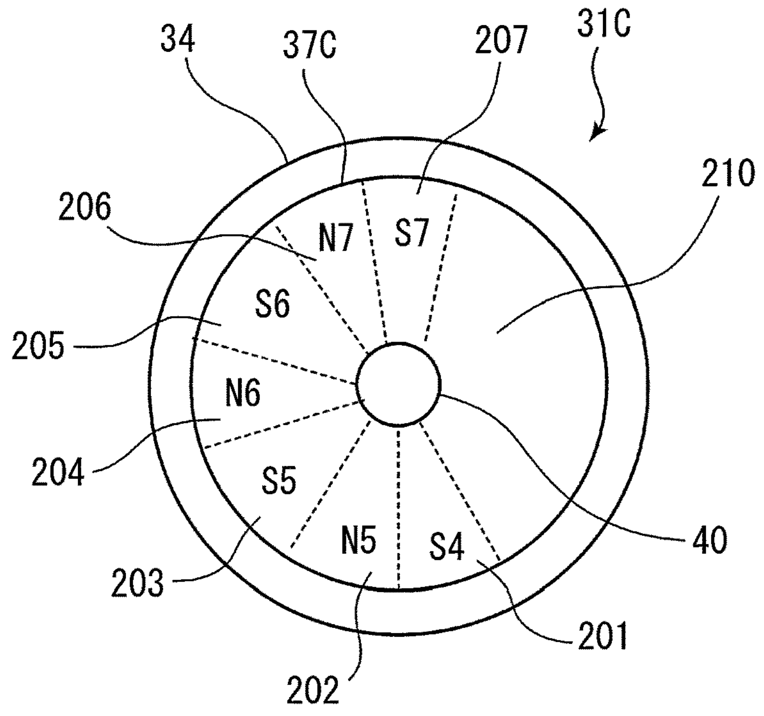
FIG. 18 is a schematic view showing a magnetic arrangement of a second developing roller in a fourth embodiment.
Figure 19:
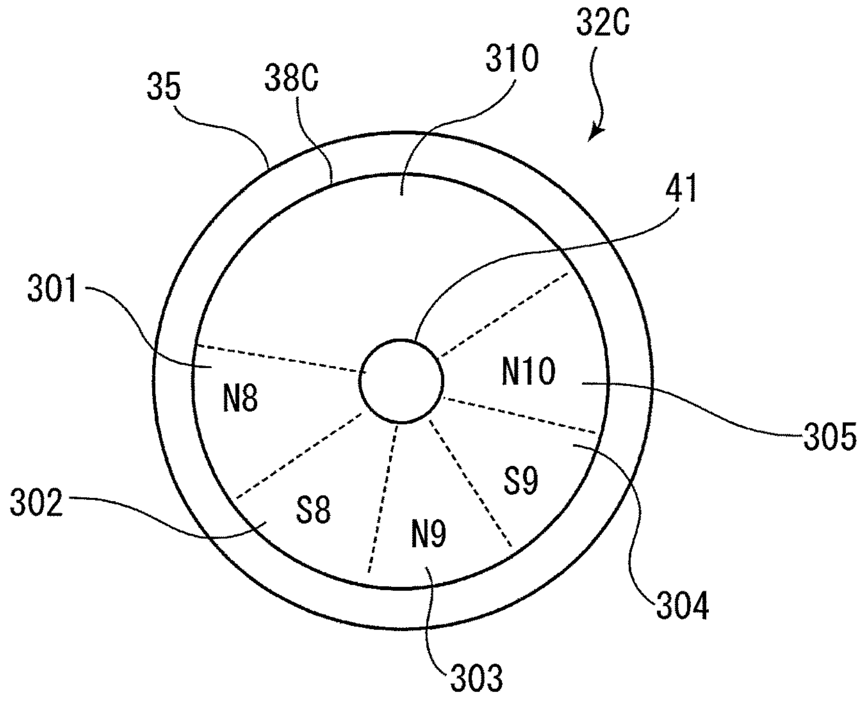
FIG. 19 is a schematic view showing a magnetic arrangement of a peeling roller in the fourth embodiment.

FIGS. 18 and 19 are conceptual views for illustrating magnetic pole constitutions of a second developing magnet 37C in a second developing sleeve 34 and a peeling magnet 38C in a peeling sleeve 35, respectively, in this embodiment.

Figure 20:
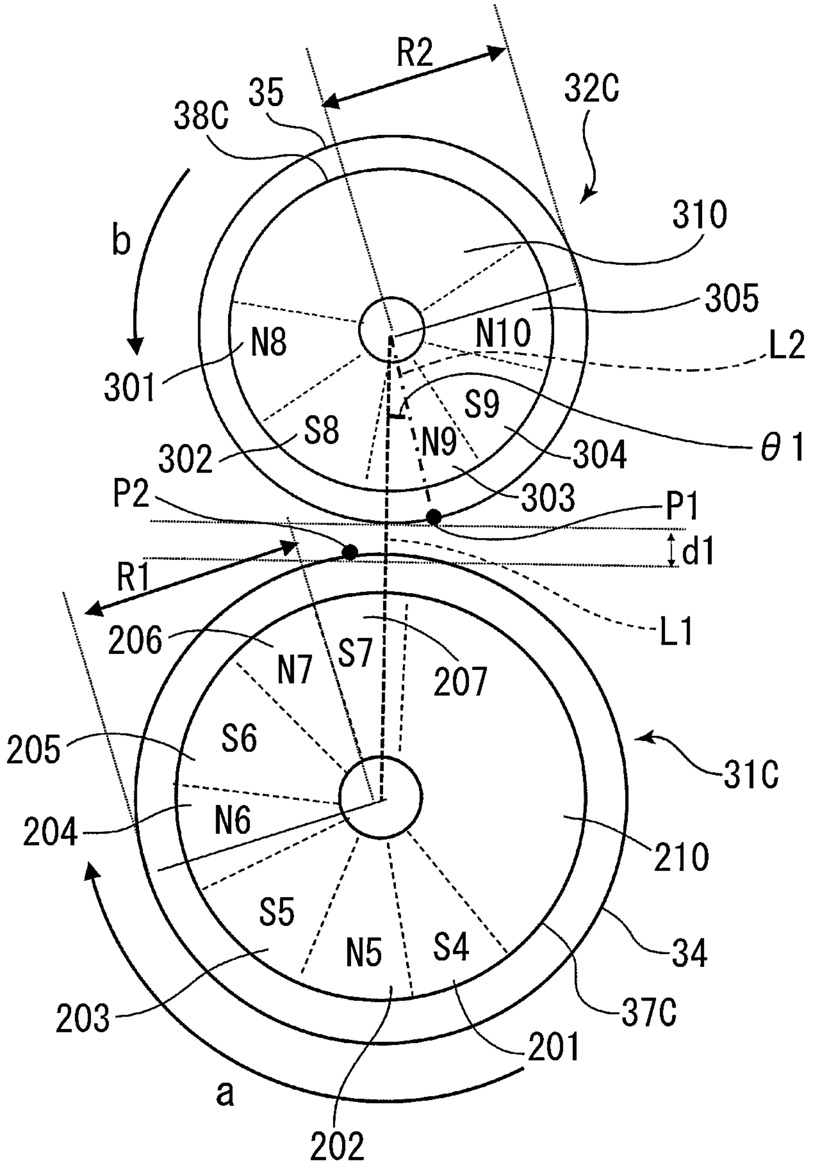
FIG. 20 is an enlarged view of the second developing roller, the peeling roller, and a periphery thereof in the fourth embodiment.

Further, FIG. 20 shows a magnetic pole constitution and a positional relationship between the second developing roller 31C and the peeling roller 32C in this embodiment. In this embodiment, the peak position P1 which is a position of a maximum value of a normal component of the magnetic flux density of the receiving pole 303(N9) on the peeling sleeve 35 is positioned above, in the vertical direction, the peak position P2 which is the position of the maximum value of the normal component of the magnetic flux density of the delivering pole 207 on the second developing sleeve 34. Incidentally, in the first embodiment, the peak position P1 which is the position of the maximum value of the normal component of the magnetic flux density of the receiving pole 303(N9) on the peeling sleeve 35 was positioned below, in the vertical direction, the peak position P1 which is the position of the maximum value of the normal component of the magnetic flux density of the delivering pole 207 on the second developing sleeve 34.

In this embodiment, as in the first embodiment, a receiving pole 303(N9) of the peeling magnet 38 is disposed downstream, with respect to the rotational direction of the peeling sleeve 35, of the opposing portion between the second developing sleeve 34 and the peeling sleeve 35. In addition thereto, the peak position P2, of the magnetic flux density on the surface of the second developing sleeve 34, formed by the delivering pole 207(S7) of the second developing magnet 37C is positioned below, in the direction of gravitation, the peak position P1 of the magnetic flux density, on the surface of the peeling sleeve 35, formed by the receiving pole 303(N9) of the peeling magnet 38C. For this reason, in this embodiment, the peeling roller 32C is positioned above the second developing roller 31C.

In the case of this embodiment, a magnetic force acting from the receiving pole 303 of the peeling magnet 38C onto the developer is about 5 to 10 times the gravity acting on the developer, and therefore, the developer is collected from the second developing sleeve 34 toward the peeling sleeve 35.

In this case, similarly as in the first embodiment, contact pressure between the surface of the second developing sleeve 34 and the end of the magnetic chain carried on the peeling sleeve 35 is reduced, and therefore, it is possible to suppress the amount of the developer remaining on the surface of the second developing sleeve 34.

However, the direction of the magnetic force acting from the receiving pole 303 of the peeling magnet 38C on the developer and the direction of gravitation acting on the developer are different from each other, and therefore, a force for collecting the developer from the second developing sleeve 34 to the peeling sleeve 35 becomes weak, so that compared with the constitution of the first embodiment, the amount of the developer remaining on the surface of the second developing sleeve 34 becomes large.

Other Embodiments

In the above-described embodiments, the developing device provided with two developing rollers was described, but even in a constitution of a single developing roller, the present invention is applicable thereto. That is, even in a constitution in which a single developing roller for developing the electrostatic latent image on an image bearing member such as the photosensitive drum is used and in which a peeling roller for peeling the developer from this developing roller is provided, the present invention is applicable thereto.

The present invention is not limited to the constitution of the above-described embodiments. For example, the image forming apparatus 100 is not limited to the MFP, but may also be a copying machine, a printer, or a facsimile machine. Further, the constitutions of the developer supplying screw 42, the developer stirring screw 43, and the developer collecting screw 44 are not particularly limited when the constitutions can feed the developer, and for example, it is possible to apply a helical blade, a paddle-like blade.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-171510 filed on Oct. 2, 2023, which is hereby incorporated by reference herein in its entirety.

What is claimed is:

1. A developing device comprising:

a first chamber configured to accommodate a developer including toner and a carrier;

a second chamber partitioned from the first chamber by a partition wall;

a first rotatable member to which the developer accommodated in the first chamber is supplied and which carries and feeds the developer to a developing position where an electrostatic latent image formed on an image bearing member is developed;

a first magnet provided non rotatably and stationarily inside the first rotatable member, wherein the first magnet includes a first magnetic pole provided opposed to the image bearing member in the developing position, a second magnetic pole provided downstream of the first magnetic pole with respect to a rotational direction of the first rotatable member, and a third magnetic pole provided downstream of the second magnetic pole and adjacent to the second magnetic pole, with respect to the rotational direction of the first rotatable member, and having the same magnetic polarity as that of the second magnetic pole, with a repelling magnetic field being generated between the second magnetic pole and the third magnetic pole;

a second rotatable member provided opposed to the first rotatable member and to which the developer is delivered from the first rotatable member by a magnetic field generated by the first magnet, wherein the second rotatable member carries and feeds the developer for collecting the developer, after the electrostatic latent image is developed, into the second chamber; and a second magnet provided non rotatably and stationarily inside the first second rotatable member, wherein the second magnet includes a plurality of magnetic poles including a fourth magnetic pole having a magnetic polarity different from that of the second magnetic pole, a fifth magnetic pole provided downstream of the fourth magnetic pole with respect to a rotational direction of the second rotatable member, and a sixth magnetic pole provided downstream of the fifth magnetic pole and adjacent to the fifth magnetic pole, with respect to the rotational direction of the second rotatable member, and having the same magnetic polarity as that of the fifth magnetic pole, with a repelling magnetic field being generated between the fifth magnetic pole and the sixth magnetic pole, and the fourth magnetic pole being a magnetic pole, of the plurality of magnetic poles, provided closest to the second magnetic pole, wherein the rotational direction of the second rotatable member, in a position where on an outer peripheral surface of the second rotatable member, the second rotatable member is closest to the first rotatable member, is the same as the rotational direction of the first rotatable member in a position where on an outer peripheral surface of the first rotatable member, the first rotatable member is closest to the second rotatable member, and wherein with respect to the rotational direction of the second rotatable member, a maximum position where a magnetic flux density of the fourth magnetic pole in a normal direction relative to the outer peripheral surface of the second rotatable member is maximum is positioned downstream of the position where on the outer peripheral surface of the second rotatable member, the second rotatable member is closest to the first rotatable member, and is positioned upstream of the fifth magnetic pole.

2. A developing device according to claim 1, wherein in a case where a radius of the first rotatable member is R1, a radius of the second rotatable member is R2, a closest distance between the first rotatable member and the second rotatable member is d1, a rectilinear line connecting a rotation center of the first rotatable member and a rotation center of the second rotatable member is L1, a rectilinear line connecting the maximum position and the rotation center of the second rotatable member is L2, and an angle formed by the rectilinear line L1 and the rectilinear line L2 is Θ1, the following relationship is satisfied:

$$(R1+R2+d1)\times\sin(\Theta 1)<R1.$$

3. A developing device according to claim 1, wherein with respect to the rotational direction of the first rotatable member, a maximum position where a magnetic flux density of the second magnetic pole in a normal direction relative to the outer peripheral surface of the first rotatable member is maximum is positioned downstream of the position where on the outer peripheral surface of the rotatable member, the first rotatable member is closest to the second rotatable member, and is positioned upstream of the third magnetic pole.

4. A developing device according to claim 1, wherein with respect to the rotational direction of the first rotatable member, a maximum position where a magnetic flux density of the second magnetic pole in a normal direction relative to the outer peripheral surface of the first rotatable member is maximum is positioned upstream of an uppermost position of the first rotatable member with respect to a vertical direction of the first rotatable member on the outer peripheral surface of the first rotatable member, and is positioned downstream of the first magnetic pole.

5. A developing device according to claim 1, wherein with respect to a vertical direction, the maximum position where the magnetic flux density of the fourth magnetic pole in the normal direction relative to the outer peripheral surface of the second rotatable member is maximum is positioned below a maximum position where a magnetic flux density of the second magnetic pole in a normal direction relative to the outer peripheral surface of the first rotatable member is maximum.

6. A developing device according to claim 1, wherein with respect to a vertical direction, the maximum position where the magnetic flux density of the fourth magnetic pole in the normal direction relative to the outer peripheral surface of the second rotatable member is maximum is positioned above a maximum position where a magnetic flux density of the second magnetic pole in a normal direction relative to the outer peripheral surface of the first rotatable member is maximum.

7. A developing device according to claim 1, in a case where a surface moving speed of the first rotatable member is v1 and a surface moving speed of the second rotatable member is v2, the following relationship is satisfied:

$$v1\leq v2.$$

8. A developing device according to claim 1, wherein a shortest distance between the first rotatable member and the second rotatable member is 0.2 mm or more and 3 mm or less.

9. A developing device according to claim 1, wherein the rotation center of the second rotatable member is positioned above the rotation center of the first rotatable member with respect to a vertical direction.

10. A developing device according to claim 1, further comprising:

a first feeding screw provided in the first chamber and configured to feed the developer accommodated in the first chamber; and a second feeding screw provided in the second chamber and configured to feed the developer collected in the second chamber, wherein a rotation center of the second feeding screw is positioned above a rotation center of the first feeding screw with respect to a vertical direction.

11. A developing device according to claim 1, further comprising:

a third rotatable member provided opposed to the first rotatable member and to which the developer accommodated in the first chamber is supplied, wherein the third rotatable member carries and feeds the developer for developing the electrostatic latent image; and a third magnet provided stationarily inside the third rotatable member, wherein a rotational direction of the third rotatable member in a position where on an outer peripheral surface of the third rotatable member, the third rotatable member is closest to the first rotatable member is opposite to the rotational direction of the first rotatable member in a position where the first rotatable member is closest to the third rotatable member, and wherein to the first rotatable member, the developer is delivered from the third rotatable member by a magnetic field generated by the third magnet.

* * * * *